(12) United States Patent
Park et al.

(10) Patent No.: US 7,907,970 B2
(45) Date of Patent: Mar. 15, 2011

(54) PROVIDING QUALITY OF SERVICE FOR VARIOUS TRAFFIC FLOWS IN A COMMUNICATIONS ENVIRONMENT

(75) Inventors: Vincent D. Park, Budd Lake, NJ (US); Georgios Tsirtsis, New York, NY (US); Alan William O'Neill, Henley Beach (AU); M. Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 944 days.

(21) Appl. No.: 11/537,540

(22) Filed: Sep. 29, 2006

(65) Prior Publication Data

US 2007/0242738 A1 Oct. 18, 2007

Related U.S. Application Data

(60) Provisional application No. 60/792,012, filed on Apr. 14, 2006.

(51) Int. Cl.
*H04M 1/00* (2006.01)
*H04B 1/38* (2006.01)

(52) U.S. Cl. ............... 455/561; 455/450; 455/452.2; 455/560

(58) Field of Classification Search .......... 455/455, 455/452.2, 560, 561
See application file for complete search history.

(56) References Cited

U.S. PATENT DOCUMENTS

| | | | |
|---|---|---|---|
| 6,335,963 B1 | 1/2002 | Bosco | |
| 6,970,719 B1 | 11/2005 | McConnell et al. | |
| 7,010,305 B2 | 3/2006 | Immonen et al. | |
| 7,154,416 B1 * | 12/2006 | Savage | 341/51 |
| 7,158,788 B2 | 1/2007 | Holler et al. | |
| 7,408,907 B2 | 8/2008 | Diener | |
| 7,409,428 B1 | 8/2008 | Brabec et al. | |
| 7,426,181 B1 * | 9/2008 | Feroz et al. | 370/232 |
| 2002/0132611 A1 | 9/2002 | Immonen | |
| 2002/0160811 A1 * | 10/2002 | Jannette et al. | 455/560 |
| 2003/0067903 A1 | 4/2003 | Jorgensen | |

(Continued)

FOREIGN PATENT DOCUMENTS

KR 1020030047804 6/2003

(Continued)

OTHER PUBLICATIONS

Yavatkar R. et al. : "RFC 2753 A Framework for Policy-based Administration Control" Internet Citation, Online, Jan. 2000, XP002179102, Retrieved from the Internet: URL:http://www.ietf.org/rfc/rfc2753.txt?number=2753, retrieved on Oct. 2, 2001, p. 1, line 33-line 38, p. 5, line 40-p. 7, line 29.

(Continued)

*Primary Examiner* — Tuan H Nguyen
(74) *Attorney, Agent, or Firm* — François A. Pelaez

(57) ABSTRACT

The claimed subject matter relates to providing appropriate QoS treatment to one or more traffic flows associated with a terminal, wherein the QoS treatment is defined within a profile assigned to the terminal and implemented when the terminal requests access to a network. An access mode can receive identifying indicia associated with the terminal and relays such indicia to an authentication and authorization server (AAS). The AAS can thereafter provide the access node with a profile that defines QoS treatment to associate with one or more traffic flows related to the terminal.

24 Claims, 20 Drawing Sheets

U.S. PATENT DOCUMENTS

| | | |
|---|---|---|
| 2003/0119515 A1 | 6/2003 | Holler et al. |
| 2004/0047324 A1 | 3/2004 | Diener |
| 2004/0054766 A1 | 3/2004 | Vicente |
| 2004/0176094 A1 | 9/2004 | Kim et al. |
| 2005/0014509 A1* | 1/2005 | Semper et al. ............. 455/452.2 |
| 2005/0055220 A1* | 3/2005 | Lee et al. .......................... 705/1 |
| 2006/0069664 A1 | 3/2006 | Ling et al. |
| 2006/0088058 A1 | 4/2006 | Eckert et al. |
| 2007/0024440 A1 | 2/2007 | Moran et al. |
| 2007/0147424 A1 | 6/2007 | Anigstein |
| 2007/0298788 A1 | 12/2007 | Corson et al. |
| 2008/0304416 A1 | 12/2008 | Fodor et al. |
| 2009/0097402 A1 | 4/2009 | Stumpert et al. |

FOREIGN PATENT DOCUMENTS

WO    WO2006058116    6/2006

OTHER PUBLICATIONS

International Search Report ISA EPO PCT/US2007/066663 Sep. 25, 2007.

* cited by examiner

PROVIDING QUALITY OF SERVICE FOR VARIOUS TRAFFIC FLOWS IN A COMMUNICATIONS ENVIRONMENT

CROSS-REFERENCE TO RELATED APPLICATION

This application claims the benefit of U.S. Provisional Patent Application No. 60/792,012 entitled METHODS AND APPARATUS FOR STATIC QUALITY OF SERVICE, and filed on Apr. 14, 2006. The entirety of this application is incorporated herein by reference.

BACKGROUND

I. Field

The following description relates generally to communications systems, and more particularly to providing refined quality of service with respect to one or more traffic flows associated with a terminal.

II. Background

Communication networks, such as wireless communication networks, broadband networks, and any other suitable networks are utilized in connection with transferring data, wherein data can include word processing files, streaming video, multimedia files, voice data, and/or the like. When using such networks, some subscribers to the network may be provided with different quality of service (QoS) parameters than other subscribers. Pursuant to an example, a first individual may subscribe to a Digital Subscriber Line (DSL) network and be provided with first upload and download speeds, while a second individual subscribed to the DSL network may pay a different subscription rate than the first individual and be provided with different upload and download speeds. With still more specificity, the first subscriber may pay a first rate for 1 Megabyte/second download connection speed while the second subscriber may pay a second rate for 512 Kilobyte/second download connection speed.

Additionally, users of networks can be provided with different services. For instance, wireless network subscribers can purchase subscriptions that enable web-browsing, text message delivery and receipt, voice calls, data transmittal (e.g., video, pictures, sound clips, . . . ), gaming, etc. As the data types are different, it may be desirable to associate the different services with different QoS parameters (e.g., latency, bandwidth, . . . ). Conventionally, however, identical QoS treatment is provided to different services that are associated with a subscriber, which can result in suboptimal utilization of network resources as well as suboptimal performance with respect to services provided to the subscriber. Thus, identical QoS treatment is provided with respect to voice calls and web browsing, even though web traffic is typically associated with bursts of data while voice traffic tends to be steady (and should not be associated with large latency).

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to providing appropriate QoS treatment to one or more traffic flows associated with a subscriber, e.g., subscriber device or terminal, wherein the QoS treatment is defined within a profile assigned to the terminal and implemented when the terminal requests access to a network. An access node can receive identifying indicia associated with the terminal and relays such indicia to an authentication and authorization server (AAS). The AAS can thereafter provide the access node with a profile that defines QoS treatment to associate with one or more traffic flows related to the terminal.

In accordance with an aspect, a method for configuring quality of service (QoS) with respect to a terminal is disclosed, wherein the method comprises receiving identifying indicia associated with the terminal and subsequently delivering a profile to an access node that is communicatively coupled to the terminal after receipt of the identifying indicia. The profile can include parameters that prescribe treatment with respect to one or more traffic flows associated with the terminal and one or more filter rules that associate at least one traffic flow with a prescribed treatment. Additionally, a communications apparatus is described herein, wherein the communications apparatus can comprise a memory that retains instructions for analyzing identifying indicia associated with a terminal requesting access to a network and providing a profile based at least in part upon the analysis. For example, the profile can include QoS parameters with respect to multiple traffic flows associated with the terminal. The communications apparatus can additionally include a processor that executes the instructions.

In another aspect, a communications apparatus is disclosed below, wherein the communications apparatus comprises means for receiving identifying indicia associated with a wireless terminal that is requesting access to one or more network services. The communications apparatus can additionally include means for subsequently delivering a profile to an access node that is communicatively coupled to the terminal after receipt of the identifying indicia. For instance, the profile can define QoS parameters with respect to one or more traffic flows associated with the terminal.

In yet another aspect, a machine-readable medium is described, wherein the machine-readable medium has stored thereon machine-executable instructions for receiving an identity of at least one of a terminal and a subscriber and delivering a profile assigned to the at least one of the terminal and subscriber to a base station. For example, the profile can define QoS parameters for one or more traffic flows associated with the terminal and include filter rules that associate at least one prescribed QoS treatments to the one or more traffic flows. Further, a processor is contemplated, wherein the processor executes instructions for receiving identifying indicia associated with a wireless terminal that is requesting access to one or more network services and delivering a profile associated with wireless terminal to a base station that is communicatively coupled to the wireless terminal. For example, the profile can include QoS treatments to provide to one or more traffic flows associated with the wireless terminal and filter rules that associate prescribed QoS treatments to the one or more traffic flows.

In still another aspect, a method for providing QoS treatment to one or more traffic flows associated with a terminal can comprise receiving a profile associated with a wireless terminal, wherein the profile includes QoS treatments to provide to the wireless terminal with respect to one or more traffic flows and filter rules that facilitates assignment of data packets to the one or more traffic flows and association of the data packets with prescribed QoS treatments. The method can additionally include providing QoS treatment to the one or more traffic flows based at least in part upon contents of the profile. A base station is also described below, wherein the base station comprises means for providing data that identifies at least one of a terminal and a subscriber to an authentication and authorization server and means for receiving a profile assigned to the at least one of the terminal and the subscriber from the authentication and authorization server. For example, the profile can define QoS treatments to provide to one or more traffic flows associated with the terminal and can include filter rules that associate prescribed QoS treatments to data packets that correspond to the one or more traffic flows. The base station can also include means for providing QoS treatments to the one or more traffic flows based at least in part upon contents of the profile.

In another aspect, a machine-readable medium is disclosed, wherein the machine-readable medium has stored thereon instructions for receiving a profile associated with a wireless terminal, wherein the profile includes QoS treatments to provide to the wireless terminal with respect to one or more traffic flows and filter rules that facilitate assigning data packets to the one or more traffic flows. The machine-readable medium can include additional machine-executable instructions for providing QoS treatment to the one or more traffic flows based at least in part upon contents of the profile. Moreover, a processor is described herein, wherein the processor can be configured to execute instructions for providing data that identifies at least one of a terminal and a subscriber to an authentication and authorization server and receiving a profile assigned to the at least one of the terminal and the subscriber from the authentication and authorization server, wherein the profile defines QoS treatments to provide to one or more traffic flows associated with the terminal. The processor can be further configured to execute instructions for providing QoS treatment to the one or more traffic flows based at least in part upon contents of the profile.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
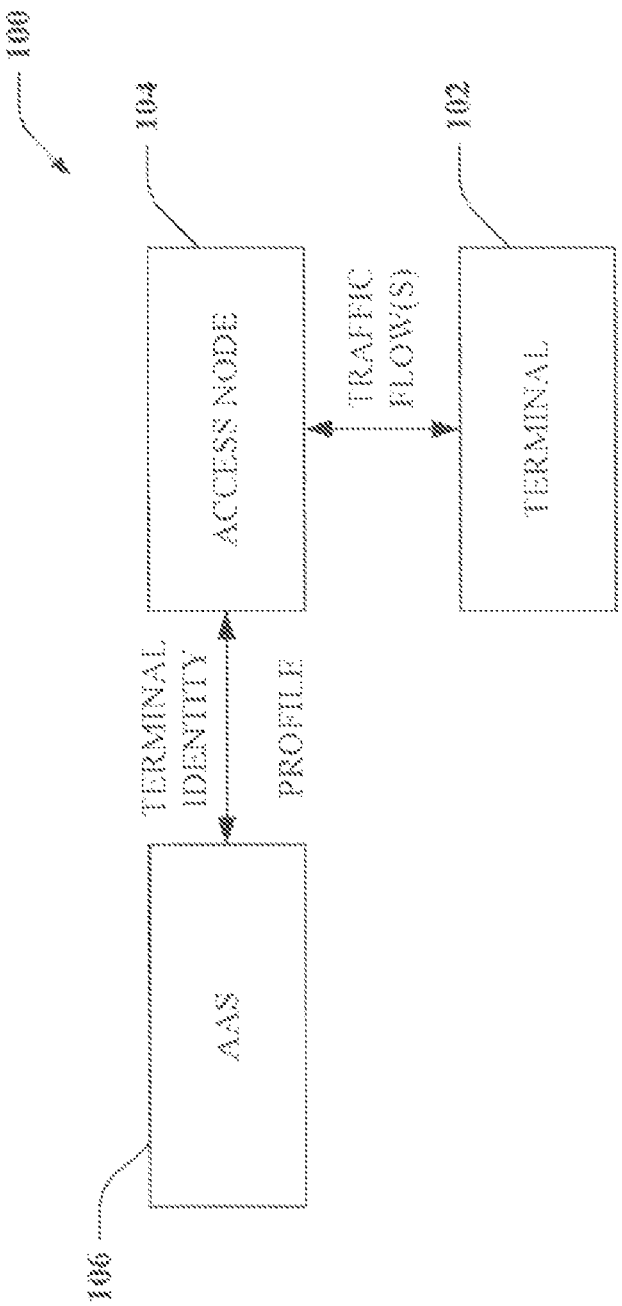
FIG. 1 is a high level block diagram of a system that is provided to illustrate provision of a profile that defines QoS parameters associated with one or more traffic flows to an access node that is communicatively coupled to a terminal.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Referring now to FIG. 1, a system 100 that facilitates providing a terminal with prescribed QoS treatment for one or more traffic flows sent and/or received by such terminal is illustrated. The system 100 includes a terminal 102, which can be, for instance, a module such as an SD card, a network card, a wireless network card, a computer (including laptops, desktops, personal digital assistants PDAs), mobile phones, smart phones, or any other suitable terminal that can be utilized to access a network. Terminal 102 accesses the network by way of an access node 104. For instance, terminal 102 can be communicatively coupled to access node 104 by way of a wired connection, such as an Ethernet cable, a USB connection, etc. In another example, a connection between terminal 102 and access node 104 may be wireless in nature, in which access node 104 may be a base station and terminal 102 may be a wireless terminal. For instance, terminal 102 and access node 104 may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Similarly to terminal 102, access node 104 can be an access node associated with a wired network or a wireless network. To that end, access node 104 can be, for instance, a router, a switch, or the like. The access node 104 can include one or more interfaces, e.g., communication modules, for communicating with other network nodes. Additionally, access node 104 may be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

System 100 can also include an authentication and authorization server (AAS) 106, which aids in enabling terminal 102 to send/receive data over a network through use of access node 104. While shown as being a separate entity, it is understood that AAS 106 can be included within access node 104. With respect to authentication/authorization, terminal 102 can provide data that is indicative of identity of such terminal 102 and/or a subscriber associated therewith to AAS 106 by way of access node 104. Access node 104 can relay the identifying data to AAS 106 without modification or can modify such data according to any suitable data format/protocol. Upon receipt of the identifying indicia, AAS 106 can authenticate terminal/subscriber identity and determine whether terminal 102 (and/or a subscriber) is authorized for one or more services. The process of authentication/authorization may, and in some embodiments does, include the exchange of one or more signals between terminal 102, access node 104, and/or AAS 106. If terminal 102 and/or a subscriber associated therewith is authorized for services, AAS 106 can relay a profile assigned to terminal 102 (or the associated subscriber) to access node 104, wherein the profile includes at least description of QoS parameters associated with one or more traffic flows relating to terminal 102, wherein a data flow can be defined as a series of related data packets (e.g., as identified based on inspection of packet headers and/or packet payloads). The profile can also include filter rules that facilitate association of data packets to traffic flows and association prescribed QoS treatments to certain traffic flows and/or data packets. Pursuant to an example, data packets with headers indicating that such packets relate to voice data can be collectively referred to as a traffic flow. Similarly, data packets indicating that such packets relate to video data can be a separate traffic flow.

Access node 104, upon receipt of the profile, can monitor and enforce QoS treatment described within the received profile. For instance, a parameter that can be utilized in connection with described QoS treatment may relate to acceptable latency associated with a traffic flow, and access node 104 can perform scheduling with respect to the traffic flow to maintain an acceptable latency as described within the profile provided from AAS 106. Other QoS parameters within the received profile can relate to minimum acceptable data rate with respect to a particular traffic flow type, maximum acceptable data rate with respect to a particular traffic flow type, etc. Such parameters can be defined numerically (e.g., a minimum data rate with respect to a first traffic flow type if 128 Kb/sec) and/or relatively defined (e.g., latency with respect to a first traffic flow type is to be ½ of latency with respect to a second traffic flow type). Still further, definition of parameters can be contingent upon certain system or network state(s). In an example, a particular parameter may be relatively defined until reaching a threshold and thereafter numerically defined (e.g., a minimum data rate with respect to a first traffic flow should be twice as much as a second traffic flow, but not to exceed 1 Megabyte/second).

Additionally, the profile provided to access node 104 from AAS 106 can support object instances therein, thereby reducing duplication of parameter definitions within the profile. For example, a gaming application that is authorized for use with respect to terminal 102 may use three parallel traffic flows to support such application. Rather than defining parameters with respect to each traffic flow, a definition can be created for a single traffic flow and instances of such definition can be utilized for related traffic flows. Moreover, the profile can include filter (e.g., classification) rules, which can be employed in connection with identifying a particular traffic flow and association such flow with an instance that determines QoS treatment to assign to the traffic flow. A detailed example of a profile is provided infra. Access node 104, upon receipt of the profile, can be configured to provide QoS treatment to terminal 102 as prescribed in the profile. Thus, access node 104 can provide different QoS treatment with respect to various traffic flows and multiple users, thereby enhancing system performance and user experience.

Figure 2:
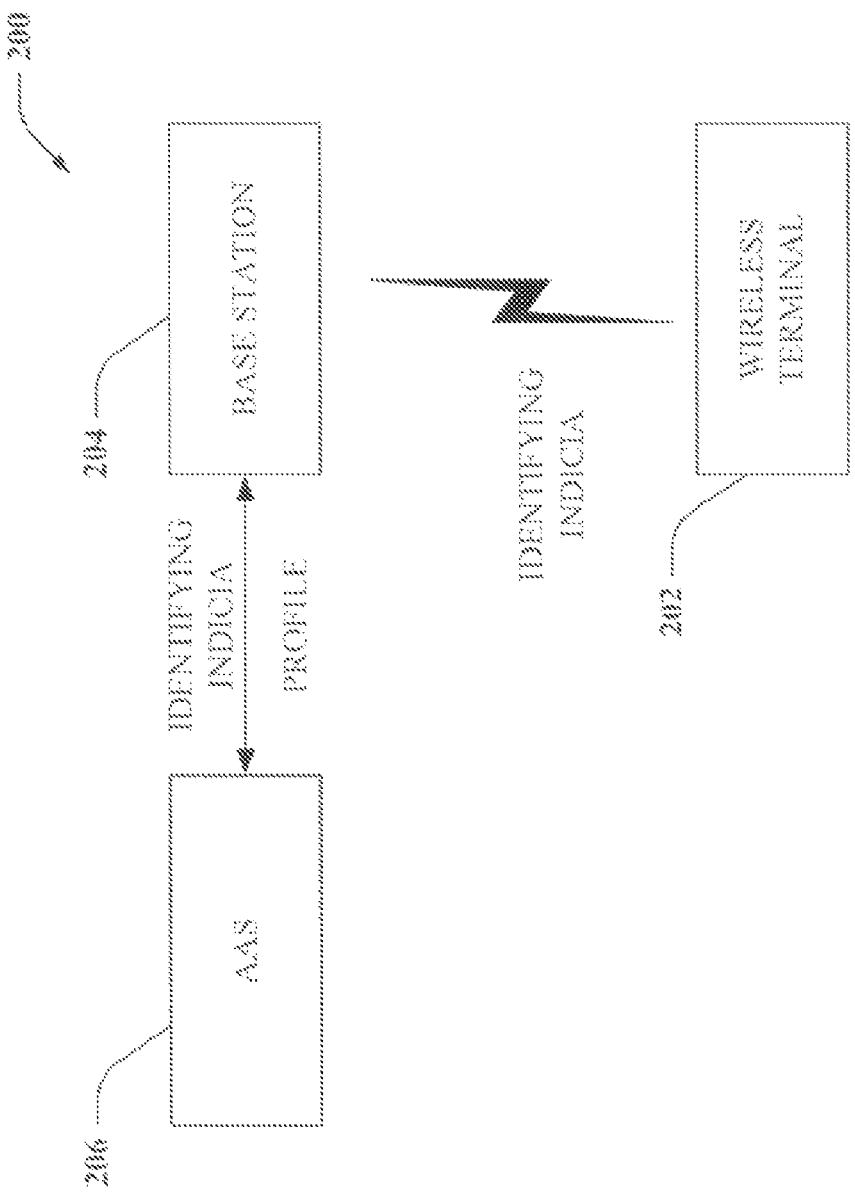
FIG. 2 is a block diagram of a system that is provided to illustrate provision of a profile that defines QoS parameters associated with one or more traffic flows to an access node that is communicatively coupled to a terminal.

Referring now to FIG. 2, an example wireless communication system 200 is illustrated. System 200 includes a wireless terminal 202 that can communicate with a base station 204 by way of an air interface. In may wireless systems, a wireless link between wireless terminal 202 and base station 204 is a most constrained link (in terms of available resources), and therefore QoS should be strictly controlled with respect to such link. Wireless terminal 202 and base station 204 can communicate by way of any suitable protocol, such as, for instance, FLASH OFDM. Other wireless communications protocols are contemplated, however, and are intended to fall under the scope of the hereto-appended claims.

Base station 204 can be utilized to provide areas of wireless network coverage to one or more wireless terminals, including wireless terminal 202. When wireless terminal 202 enters a wireless communications network (e.g., enters the wireless communications network at base station 204), wireless terminal 202 can provide base station 204 with identifying indicia, such as a network access identifier (NAI) (which can be a terminal NAI and/or a subscriber NAI), an IMSI value (or value derived therefrom), or any other suitable identifying indicia. Base station 204 can then be relay the identifying indicia to an AAS 206 (which may or may not be within a different network from base station 204), which can determine) a) whether wireless terminal 202 (or a subscriber associated therewith) is authorized to access a wireless network associated with base station 204 and b) what services/QoS parameters are associated with wireless terminal 202. AAS 206 can extract a saved profile from a database within AAS 206 and/or a data repository communicatively coupled thereto, or can generate a profile that is assigned to wireless terminal 202. The generation of the profile can be based at least in part upon identifying indicia associated with the wireless terminal, identifying indicia associated with a subscriber, and/or identifying indicia associated with an application requesting services. AAS 206 can thereafter provide base station 204 with the profile, and base station 204 can provide QoS to wireless terminal 202 according to contents of the profile. In other words, base station 204 can control scheduling and other QoS parameters with respect to wireless terminal according to contents of the profile.

Thus, at time of authentication and authorization of terminal 202, QoS parameters can be provided to base station 204, which can in turn enforce such QoS parameters with respect to wireless terminal 202. Additionally, base station 204 can configure wireless terminal 202 such that QoS parameters assigned to wireless terminal 202 are enforced on an uplink. In one example, AAS 206 can provide base station 204 with the profile by way of a Remote Dial-In User Service (RADIUS) protocol upon access being granted to terminal 202. For instance, the profile can be transported in one or more RADIUS attributes included in a RADIUS.AccessAccept message. Alternatively, the profile can be delivered from AAS 206 to base station 204 by way of the Diameter protocol or another similar protocol. Moreover, the profile can be in the form of an Extensible Markup Language (XML) document, e.g., structured in accordance with a particular schema.

Figure 3:
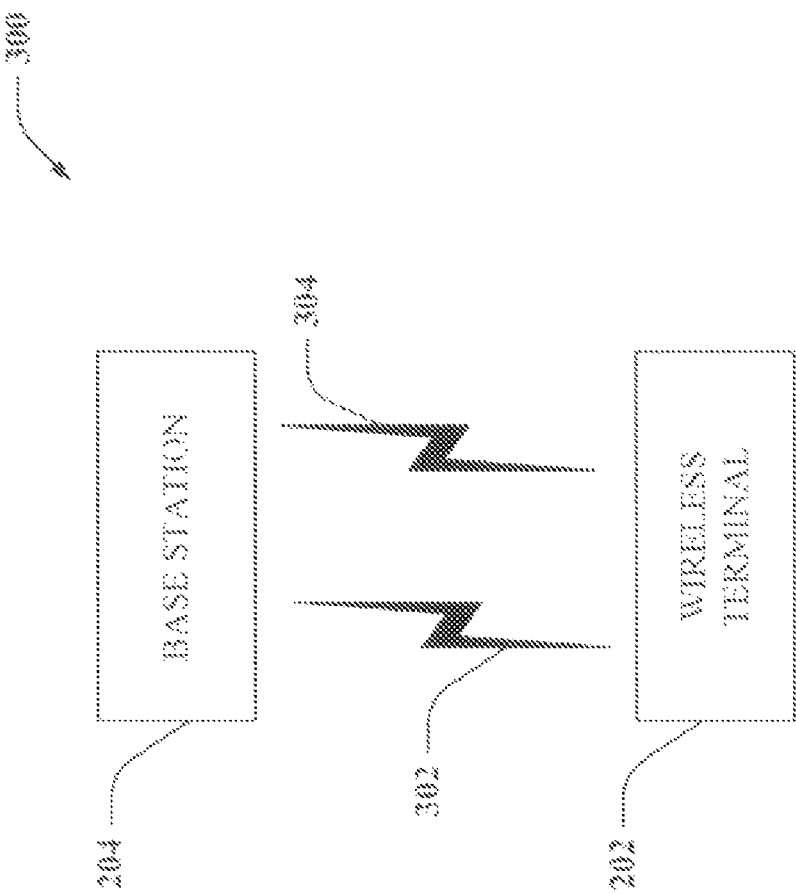
FIG. 3 is a block diagram of a system provided to illustrate QoS treatment on an uplink and a downlink.

Now referring to FIG. 3, a wireless communication system 300 is illustrated. The system 300 includes wireless terminal 202 and base station 204, as described above. Base station 204 can include a profile assigned to wireless terminal 202 (or a subscriber associated therewith), provided by AAS 206 (not shown) after wireless terminal 202 or the subscriber has been authenticated and authorization procedures have been performed. As noted infra, profile can include QoS parameters assigned to wireless terminal 202 (corresponding to, for instance, services purchased by a subscriber that utilizes wireless terminal 202). Thus, base station 204 is configured according to the profile and wireless terminal 202 can be configured based at least in part upon contents of the profile. Traffic flows can be controlled on a downlink 302 as well as on an uplink 304 between user terminal 202 and base station 204. For example, it may be desirable to provide traffic flows associated with voice calls with a first data rate on the downlink 302 and a second data rate on the uplink 304. In summary, the profile can be utilized to configure QoS parameters with respect to wireless terminal 202 on both downlink 302 and uplink 304.

Figure 4:
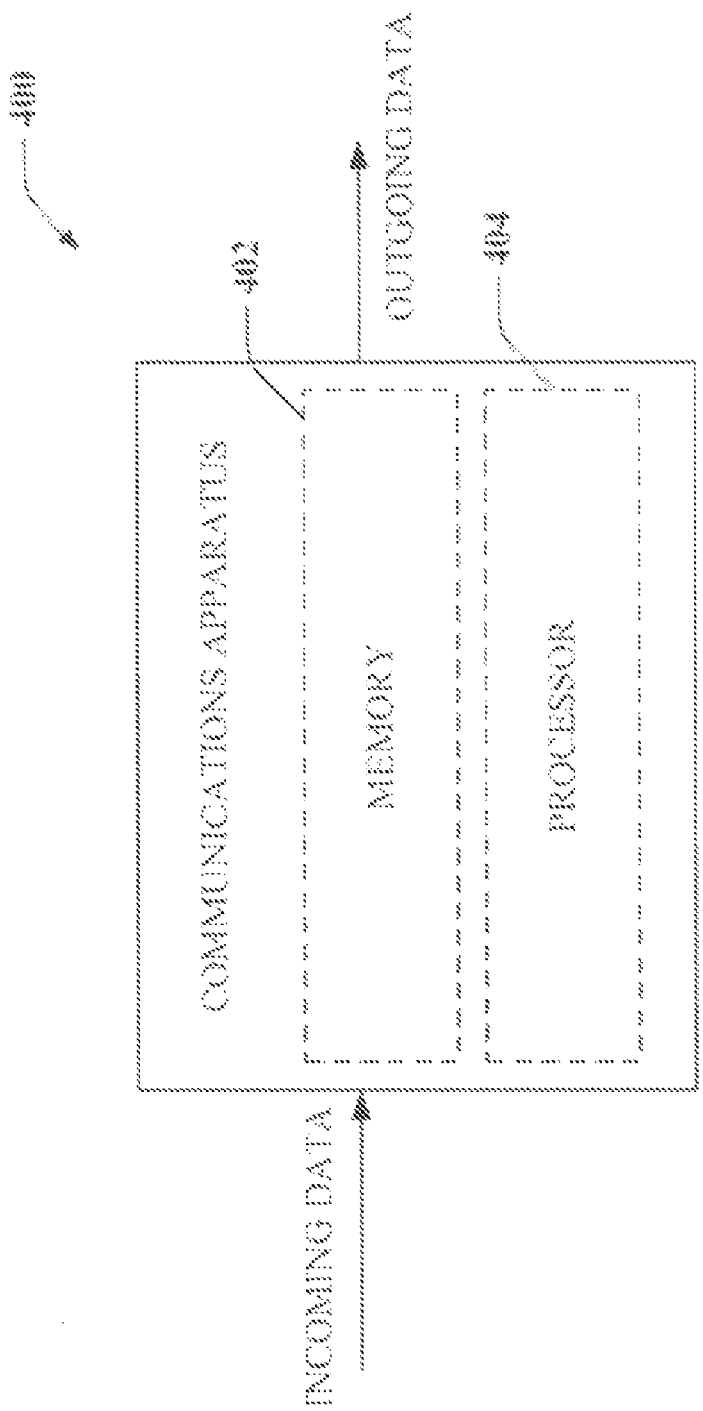
FIG. 4 illustrates an example wireless communications apparatus.

Now referring to FIG. 4, a communications apparatus 400 that can be employed within a network on connection with enabling communications within a network with respect to a terminal is illustrated. Communications apparatus 400 can be a wireless communications apparatus, for instance, such as a wireless terminal. Additionally or alternatively, communications apparatus 400 can be resident within a wired network. Communications apparatus 400 can include memory 402 that can retain instructions for configuring such apparatus with respect to QoS for a terminal (and traffic flows associated therewith). Additionally, communications apparatus 400 may include a processor 404 that can execute instructions within memory 402 and/or instructions received from another network device, wherein the instructions can relate to configuring communications apparatus 400 or a related communications apparatus.

In an example, communications apparatus 400 can be an AAS or an AAA server, which receives identifying indicia that enables communications apparatus 400 to discern identity of a terminal (e.g., a wireless or wired terminal) that is requesting access to a network or a subscriber associated with the terminal. For instance, memory 402 may include instructions for searching a database of terminals upon receipt of identifying indicia relating to a terminal. Processor 404 can execute such instructions upon receipt of the identifying indicia. Memory 402 can additionally include instructions for creating and/or locating a profile that defines QoS parameters associated with the terminal and traffic flows associated therewith, and processor 404 can execute such instructions. Moreover, memory 402 can include instructions for delivering the created profile to an access mode (e.g., a base station) that is communicatively coupled to the terminal, and processor 404 can be configured to execute such instructions.

In another example, communications apparatus 400 can be an access node, such as a base station. In such an example, memory 402 can retain instructions for determining that a terminal is attempting to access a network, receiving identifying indicia associated with the terminal and/or a subscriber, and relaying such indicia to an AAS. Processor 404 can be employed in connection with executing such instructions. Additionally, memory 402 can be utilized to retain a profile associated with the terminal (received from the AAS), wherein contents of the profile are utilized to provide appropriate QoS treatment to traffic flow(s) associated with the terminal. For instance, the profile can indicate that a certain minimum data rate is to be applied to particular traffic flows of the terminal. Processor 404 can then perform scheduling of data packets, allocation of network resources, and the like according to instructions within memory 402. Still further, memory 402 and processor 404 can operate in conjunction to configure a terminal.

In yet another example, communications apparatus 400 can be a terminal, such as a wireless terminal (e.g., an SD card, a PCMCIA card, a cellular phone, a PDA, . . . ). In this example, memory 402 can include instructions for providing identifying indicia (of the terminal or a subscriber associated therewith) to an access node when terminal attempts to access a network. Processor 404 can be configured to execute such provision of identifying indicia. Memory 402 can also be utilized to receive and retain configuration information relating to QoS parameters, such that terminal communicates with an access node according to such parameters. In a particular example, it may be desirable to reduce latency associated with voice data, and terminal can be configured such that it has knowledge of such latency constraint (as well as constraints associated with a link). Processor 404 can perform scheduling, for instance, such that communications on the uplink conform to contents of a profile associated with terminal.

Figure 5:
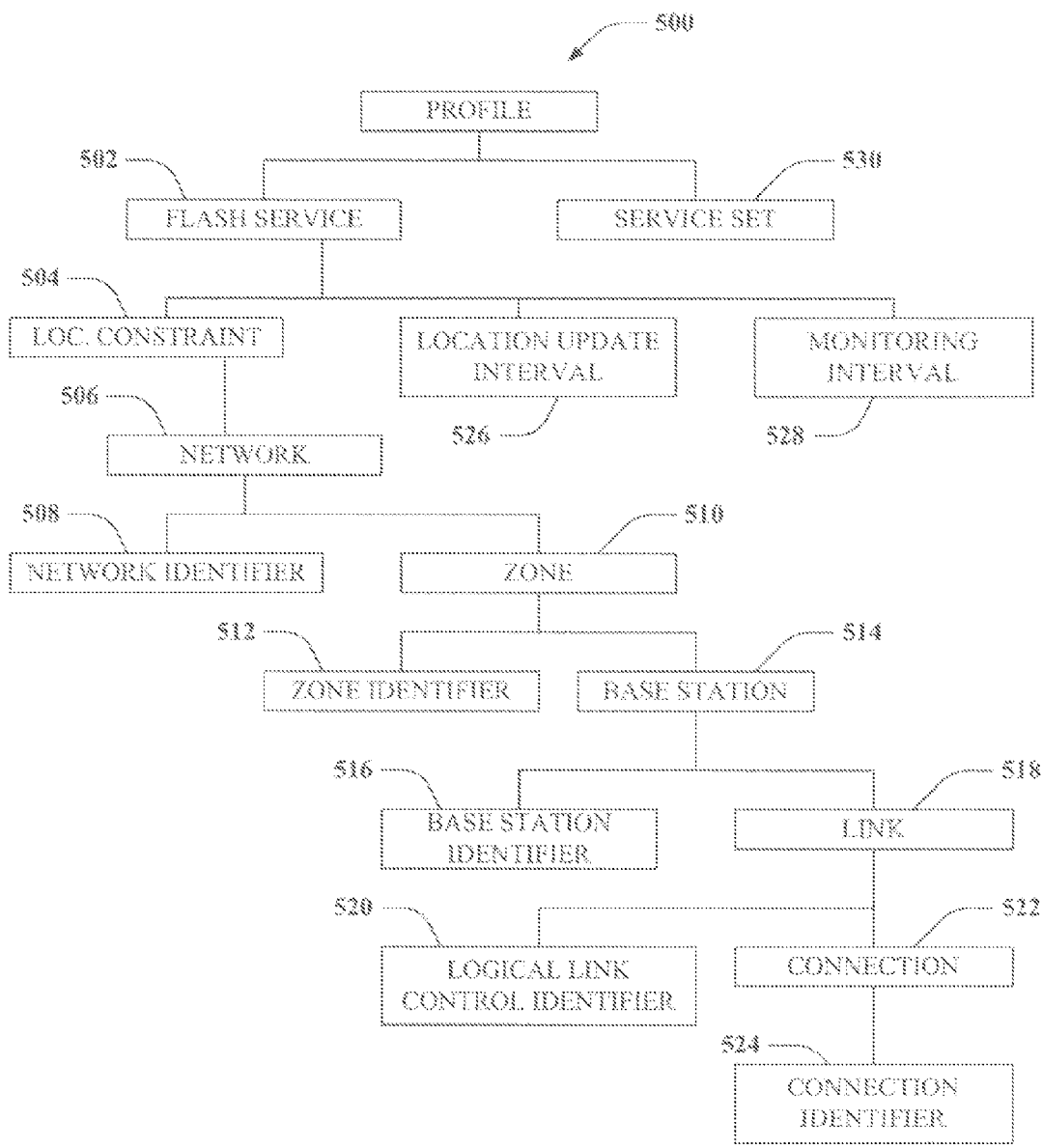
FIG. 5 illustrates example contents of a profile.

Turning now to FIG. 5, an example profile 500 in accordance with one or more aspects described herein is illustrated. The profile 500 is a logical grouping of parameters that prescribe aspects of services authorized for use by a subscriber (a particular mobile terminal). It is understood, however, that field/elements within profile 500 can be altered, such that how elements are prescribed can be altered, logical arrangements can be altered, number of elements can be altered, and names of elements can be altered while in accordance with the subject claims. The profile 500 can be associated with a flash service element 502, which is a logical grouping of parameters associated with establishing and maintaining connectivity by way of an interface, such as an air interface, including a FLASH air interface. The flush service element 502 can be associated with a location constraint element 504, which is a collection of parameters that prescribed locations (or points of attachment) through which the subscriber may be granted access for services. When location constraint element 504 is included within the profile 500, access can be limited as prescribed by elements included within location constraint element 504. Omission of location constraint element 504 indicates that access is not restricted to a list of prescribed locations, but can be restricted by other means, such as a roaming agreement.

The profile 500 can additionally include a network element 506, which can be a collection of parameters associated with a particular network through which a subscriber (terminal) may be granted access for services. Access can be limited to a set of indicated networks and, if desired, may not be granted through other networks. Network element 506 can be associated with a network identifier element 508, which can be a globally unique identifier of a network through which the subscriber can be granted access for services. Network element 506 can additionally be associated with a zone element 510, which can be defined as a collection of parameters associated with a particular zone within a network through which the subscriber can be granted access for services. Access within a network can be limited to the set of indicated zones within zone element 510. Absence of zone element 510 can indicate that access within the network identified within network identifier element 508 is not restricted to a set of prescribed zones.

Zone element 510 can be related to a zone identifier element 512, which can be a locally unique identifier of a zone within a network through which the subscriber may be granted access for services. Zones element 510 can also be related to a base station element 514, which can be defined as a collection of parameters associated with a particular base station or access node (within a zone of a network) through which the subscriber may be granted access for services. Access within a zone can be limited to a set of indicated base stations within base station element 514. Absence of a base station element 514 can indicate that access within an identified zone is not restricted to a set of particular base stations.

Base station element 514 can be associated with a base station identifier 516, which can be a locally unique identifier of a base station within a zone of a network through which the subscriber may be granted access for services. Base station element 514 can additionally be related to a link element 518, which can be a collection of parameters associated with a particular link (corresponding to an identified base station within a zone of a network) through which a subscriber may be granted access for services. For example, access by way of a base station can be limited to a set of links prescribed within the link element 518, and absence of a link element 518 within a profile can indicate that access by way of the corresponding base station is not restricted to a certain set of links.

Link elements 518 can be associated with a logical link control identifier element 520, which can be a locally unique identifier of a link corresponding to a base station within a zone of a network through which the subscriber can be granted access for services. Link element 518 can also be associated with a connection element 522, which is a collection of parameters associated with a particular connection through which the subscriber can be granted access for services. For example, access by way of a link can be limited to a set of indicated connections. Absence of a connection element can indicate that access by way of the corresponding link is not restricted to a set of prescribed connections. Thus, if access by way of a particular link is not further constrained, then it may be desirable to not include connection element 522 within profile 500. Connection element 522 can be associated with a connection identifier element 524, which can be a locally unique identifier of a connection corresponding to a link and base station within a zone of a network through which the subscriber may be granted access for services.

Profile 500 can additionally include a location update interval element 526, which can be a duration of time (e.g., in seconds) between successive instances in time at which a location update should be performed by a wireless terminal while such terminal is in a "sleep" mode, for example. A monitoring interval element 528 can indicate a duration of time (e.g., in milliseconds) between successive instances in time at which a location update is to be performed by a wireless terminal while in "sleep" mode. Profile 500 can additionally include a service set element 530 (described in detail below), which can include a set of service class and subscriber service logical data constructs that pertain to enabling and controlling services. Such element 530 can include QoS parameters relating to certain traffic flows associated with a particular terminal (e.g., wireless terminal). The information comprising the profile, including the QoS parameters, can be conveyed using XML and the structure and other characteristics, e.g., data types, formats, and/or value restrictions, of the information can be defined by an associated XML schema.

Figure 6:
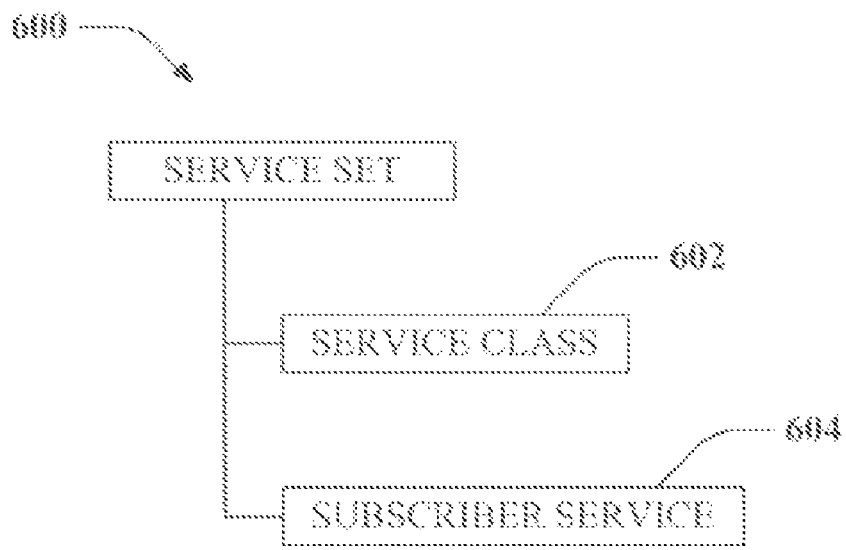
FIG. 6 illustrates an example format for a subscriber service set.

Now referring to FIG. 6, an example service set element 600 (such as service set element 530 of FIG. 5) is shown and described. It is to be understood, however, that such element is merely provided as an example, and that elements therein and/or logical associations between elements can be deleted, altered, and the like and remain in accordance with the claimed subject matter. QoS definition and control can be based at least in part upon two data constructs within service set element 600: a service class element 602 and a subscriber service element 604. While shown as a "subscriber" service element, it is understood that such element can relate to a wireless terminal. Thus, a subscriber service element can be included within a profile as a consequence of identifying indicia of a terminal and/or identifying indicia of a subscriber. Depending on the services to be provided the profile may include multiple occurrences of either or both of these data constructs. Service class element 602 (data construct) can provide a common mechanisms to prescribing QoS treatment of a traffic flow associated with an instance of a particular service class. For example, packets provided to/from a host device are classified into one or more traffic flows, where a given traffic flow may include only a specific packet stream corresponding to a particular application or may include an aggregation of packet streams corresponding to multiple applications.

Each identical traffic flow can then be associated with an instance of one or more service class elements (602). An associated service class of each identified traffic flow can provide a basis for admission control, scheduling, and traffic conditioning functions of a host device and/or an access node (access router, base station, etc.). While service class element 602 can pertain to QoS treatment, service set element 600 can pertain to policy control (e.g., authorization for services) and service definition (e.g., setting parameters values, association of identified traffic flows with instances of particular service classes to support QoS, . . . ). Each service set element can include zero or more service class elements and zero or more subscriber services elements.

Figure 7:
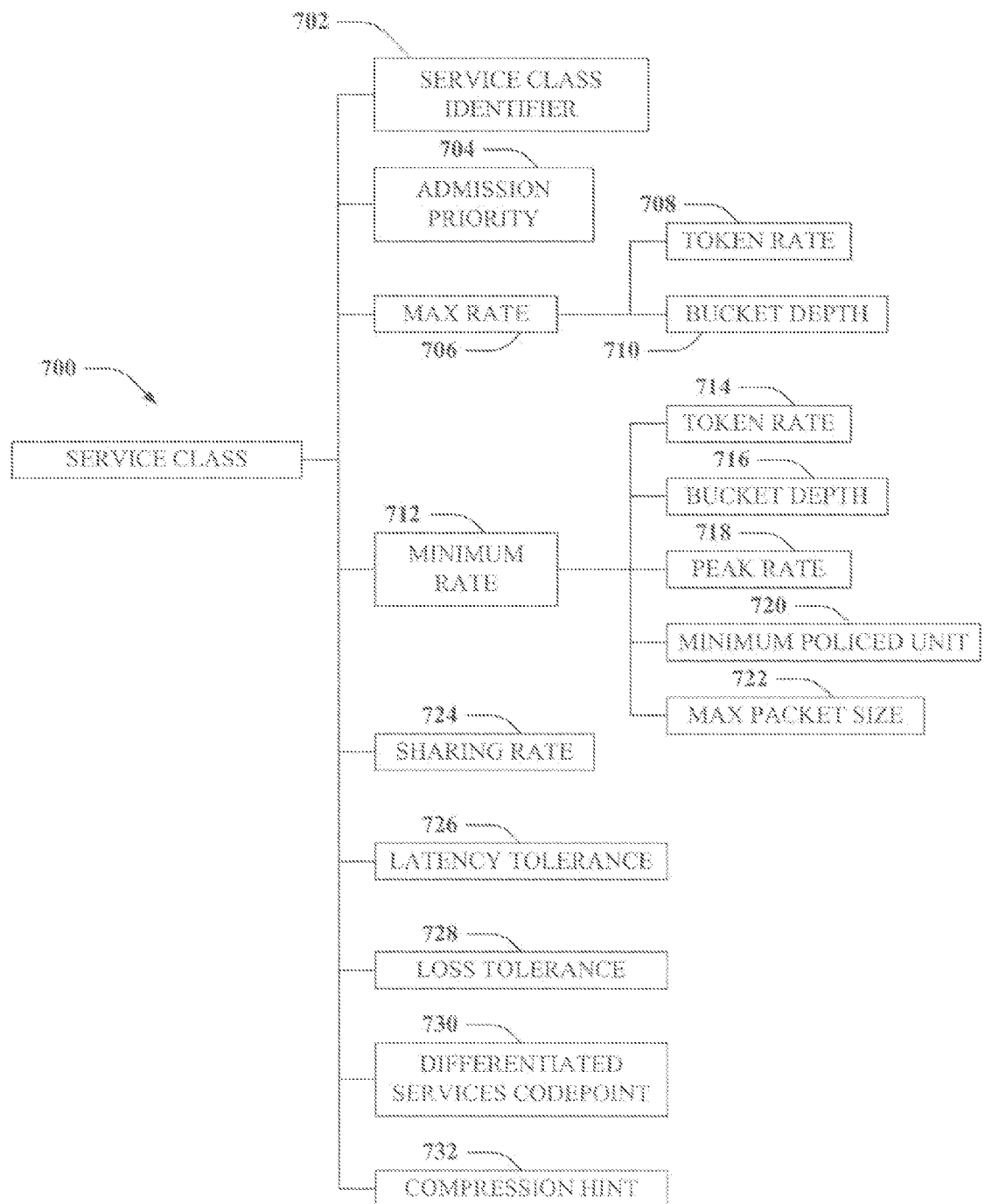
FIG. 7 illustrates an example format for a service class type.

Now turning to FIG. 7, an example service class element (such as service class element 602 shown in FIG. 6) is illustrated. Again, service class element 700 is provided as an example of one particular manner for defining QoS treatment within a profile. Other manners for doing so are contemplated by the inventors and are intended to fall under the scope of the hereto appended claims. Service class element 700 can include a service class identifier 702, which can be a globally unique identifier (e.g., 32 bit) of a defined service class, which can be represented using a notation x:y, where x and y can be hexadecimal values corresponding to a first number of bits (prefix) and a second number of bits (suffix), respectively, of service class identifier 702. For example, a set of service classed defined by a particular operator or standards organization can utilize a common service class identifier prefix.

The service class element 700 can also include an admission priority element 704. For service classes that prescribe target delivery objectives requiring allocation of dedicated resources (e.g., service classes prescribing a minimum rate and/or latency bound), admission priority element 704 indicates a relative ordering of such service classes for purpose of making resource allocation admission control decisions. Specific use of admission priority can be implementation dependent, and possible uses include priority queuing of pending resource allocation requests and/or priority of preemption of resource allocations.

A max rate element 706 indicate a maximum data rate that can be provided to a traffic flow associated with an instance of a particular service class. Maximum rate element 706 can be further defined by token bucket parameters, such as described within a token rate element 708 and a bucket depth element 710. Token rate element 708 can be in units of kilobits/second (where kilo indicates 1000), and bucket depth element 710 can be in units of byes, for instance.

A minimum rate element 712 can indicate a target minimum data rate to be provided to a traffic flow associated with an instance of a service class. Minimum rate element 712 can be further defined by a token rate element 714, a bucket depth element 716, a peak rate element 718, a minimum policed unit element 720, and a max packet size element 722. Token rate element 714 and peak rate element 718 can be in units of kilobits/second (where kilo indicates 1000), while bucket depth element 716, minimum policed unit element 720, and max packet size element 722 can be in units of bytes.

A sharing weight element 724 can be utilized to indicate a relative proportion of service (e.g., rate or resources) that a traffic flow associated with an instance of a service class should receive when competing for service with traffic flows associated with other service class instances. Thus, after the target delivery objects (e.g., minimum rates and/or latency bounds) have been met for all admitted service class instances, any remaining service capacity should be distributed among competing service class instances that are not otherwise limited (e.g., by indicating maximum rate) proportionally to their corresponding sharing weights.

A latency tolerance element 726 indicates an acceptable access link latency for packets belonging to a traffic flow associated with an instance of a service class, where access link latency includes delays associated with queuing, scheduling, and transmission. With high probability, packets belonging to a traffic flow associated with an instance of the service class should be delivered over the access link with latency below the indicated tolerance. As an example, latency tolerance element 726 can be associated with units of milliseconds.

A loss tolerance element 728 can indicate an acceptable probability of loss for packets belonging to a traffic flow associated with an instance of a service class, where sources of loss include queue management and unrecoverable transmission errors. Packets belonging to a traffic flow associated with an instance of an identified service class should be delivered over the access link with loss probability below an indicated tolerance. The loss tolerance element 728 can include data relating to number of loss packets per 100,000 packets, for example. A differentiated services (DS) codepoint 730 can indicate a DS codepoint with which packets in a traffic flow associated with an instance of an identified service class should be marked.

A compression hint element 732 can indicate that header compression is likely applicable to packets belonging to a traffic flow associated with a particular instance of a service class. Compression hint element 732 can include information to assist in determining the applicable type of compression and/or parameters needed for compression.

Figure 8:
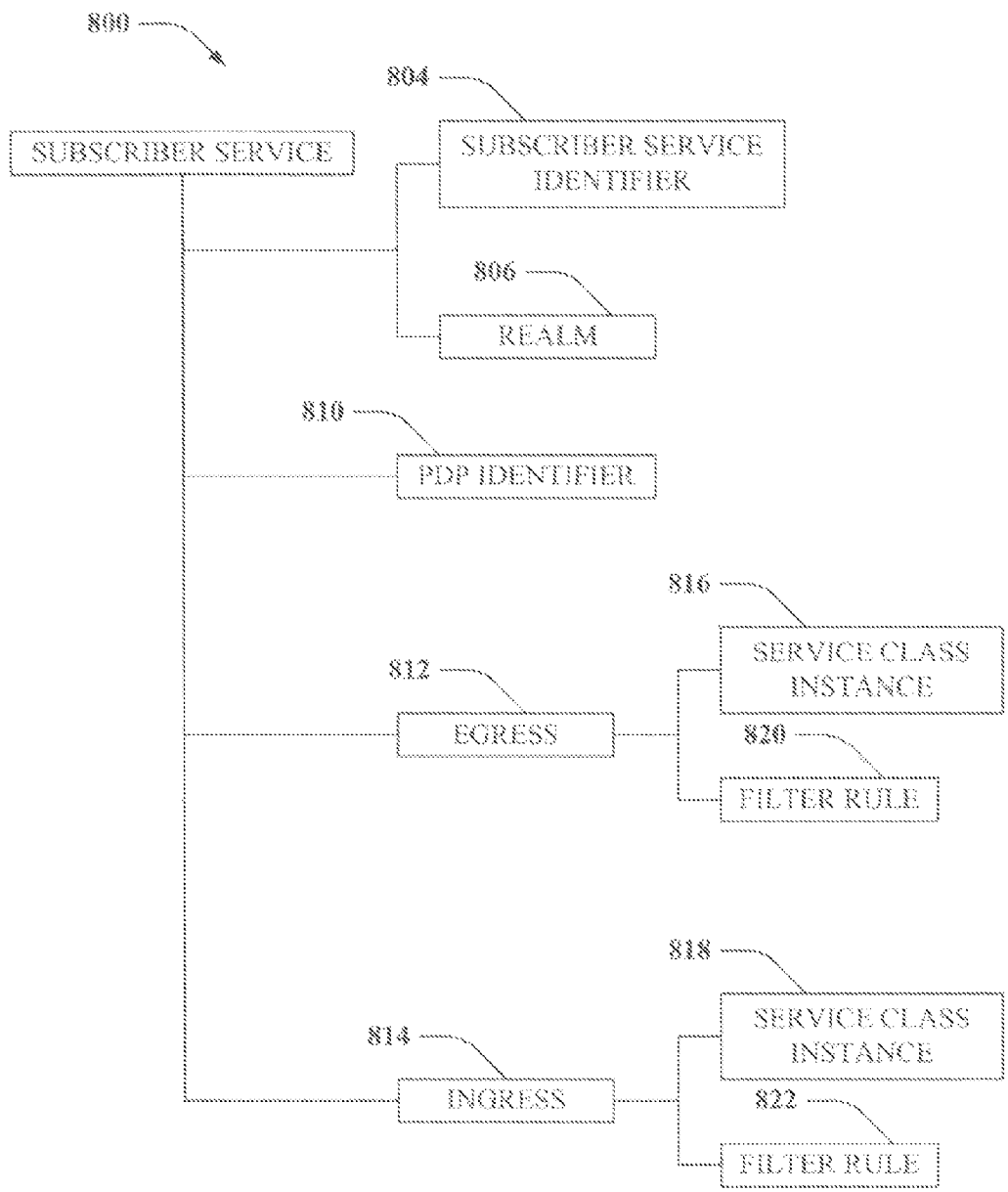
FIG. 8 illustrates an example subscriber service type.

With reference to FIG. 8, an example subscriber service element 800 (such as subscriber service element 604 of FIG. 6) is shown and described. Again, element 800 is provided as one particular manner for defining a service. Other manners for doing so are contemplated by the inventors and are intended to fall under the scope of the hereto appended claims. The subscriber service element 800 can include a subscriber service identifier element 804, which can be a globally unique identifier of a certain subscriber service, which can be represented using notation x:y, where x and y can be hexadecimal values corresponding to a first set of bits (prefix) and a last set of bits (suffix), respectively, of subscriber service identifier element 804. A set of subscriber services defined by a particular operator or standards body can use a common subscriber service identifier prefix. A realm element 806 can indicate a domain with which a subscriber service is associated, wherein absence of realm element 806 can indicate that the subscriber service is associated with a local domain. This provides a basis for better controlling services when roaming between various network operators.

Subscriber service element 800 can include a Policy Decision Point (PDP) identifier element 810. A PDP identifier element 810 can be an identifier, such as an IP address or host name, of the PDP to be used for QoS configuration change requests associated with a particular subscriber service. The subscriber service element 800 can additionally include an egress element 812, which is a logical grouping of service class instances and filter rules applicable to egress traffic from an access router to a subscriber over a corresponding access link, and an ingress element 814, which is a logical grouping of service class instances and filter rules that are applicable to ingress traffic to an access router from a subscriber over a corresponding access link.

Egress element 812 and ingress element 814 can each include one or more service class instance elements 816 and 818, respectively. Service class instance elements 816 and 818 can define static service class instances, e.g., identify a particular service class element of which an instance is required and with which a traffic flow will be associated by one or more filter rules. A static service class instance can conceptually be viewed as a persistently requested instance of a particular service class. Depending upon parameters of a corresponding service class, an admission control decision may be required. Thus, at any given point in time a static service class instance may or may not be acted (e.g., admitted), depending upon resource availability and admission priority, but should be made active whenever possible.

Egress element 812 and ingress element 814 can also each include one or more filter rule elements 820 and 822, respectively. Filter rule elements 820 and 822 define a classifier filter rule for the purpose of mapping packets belonging to a traffic flow with a defined service class instance. Each filter rule element can include a priority indicating the order in which is should be applied with respect to other filter rule elements, specification of packet matching criteria (e.g., values or ranges of values corresponding to one or more packet header or payload fields), and an indication of the service class instance with which matching packets should be associated. Filter rule elements 820 and 822 can also be used to discard packets belonging to a traffic flow by mapping them to an instance of a null service class.

Referring to FIGS. 9-12, methodologies relating to providing QoS treatment to particular traffic flow(s) associated with a terminal (e.g., end node) are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Figure 9:
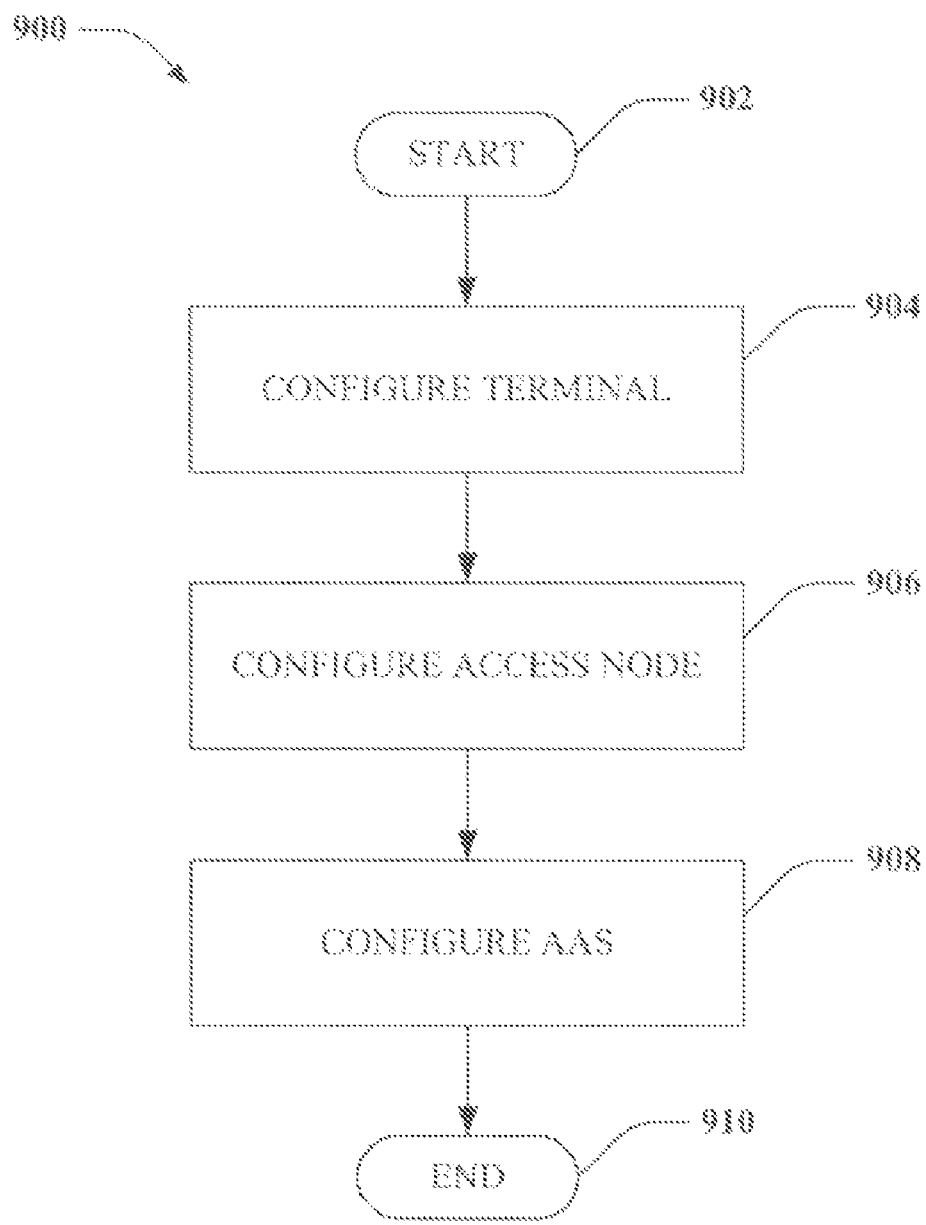
FIG. 9 is a representative flow diagram illustrating a methodology for configuring various network elements.

Referring specifically to FIG. 9, a methodology 900 that facilitates configuring a network subsystem is illustrated. The methodology 900 begins at 902, and at 904 a terminal is configured, wherein the configuration can include configuring the terminal to provide identifying indicia upon entering a network (e.g., by geographically moving into a coverage area of the network, detecting signals from a base station, . . . ). The identifying indicia can be, for instance, a terminal NAI and/or a subscriber NAI. The configuring performed at 904 can additionally include configuring the terminal to send/receive data that is associated with particular QoS treatment depending upon a traffic flow. In still more detail, the terminal can be configured to send/received data (with respect to QoS) in accordance with a profile that is provided to an access node upon the terminal being authenticated/authorized with respect to the network. The terminal can be a card that can be associated with a mobile device, a mobile device, a stationary device (such as a personal computer), etc. Moreover, terminal can be configured to communicate with one or more access nodes (e.g., base stations) in connection with requesting access to services (and utilizing such services).

At 906, an access node is configured. The configuration undertaken at 1106 can include configuring the access node to receive identifying indicia from the terminal and relaying such indicia to an AAS. The configuration can additionally include configuring the access node to receive a profile assigned to the terminal from the AAS and then servicing traffic flows to/from the terminal according to contents of the profile that relate to QoS. For instance, the profile can state that traffic flows relating to a gaming service should be associated with a particular minimum data rate, while voice data should be associated with a separate data rate (and latency). Thus, different QoS treatment can be provided to different data flows with respect to a terminal at a same instance in time. Thus, at 906 the access node (e.g., base station) can be configured to perform scheduling for traffic flows that correspond to contents of the profile.

At 908, an AAS is configured. Such configuration can comprise configuring the AAS to receive data that identifies a terminal, authenticate a terminal, authorize the terminal with respect to utilizing particular services in a network, and generating and/or locating a profile that defines QoS parameters with respect to at least one traffic flow that can be associated with a terminal. Additionally, the AAS can be configured at 908 to provide the profile to an access node that is communicatively coupled to a terminal to which the profile is assigned. The methodology 900 then completes at 910.

Figure 10:
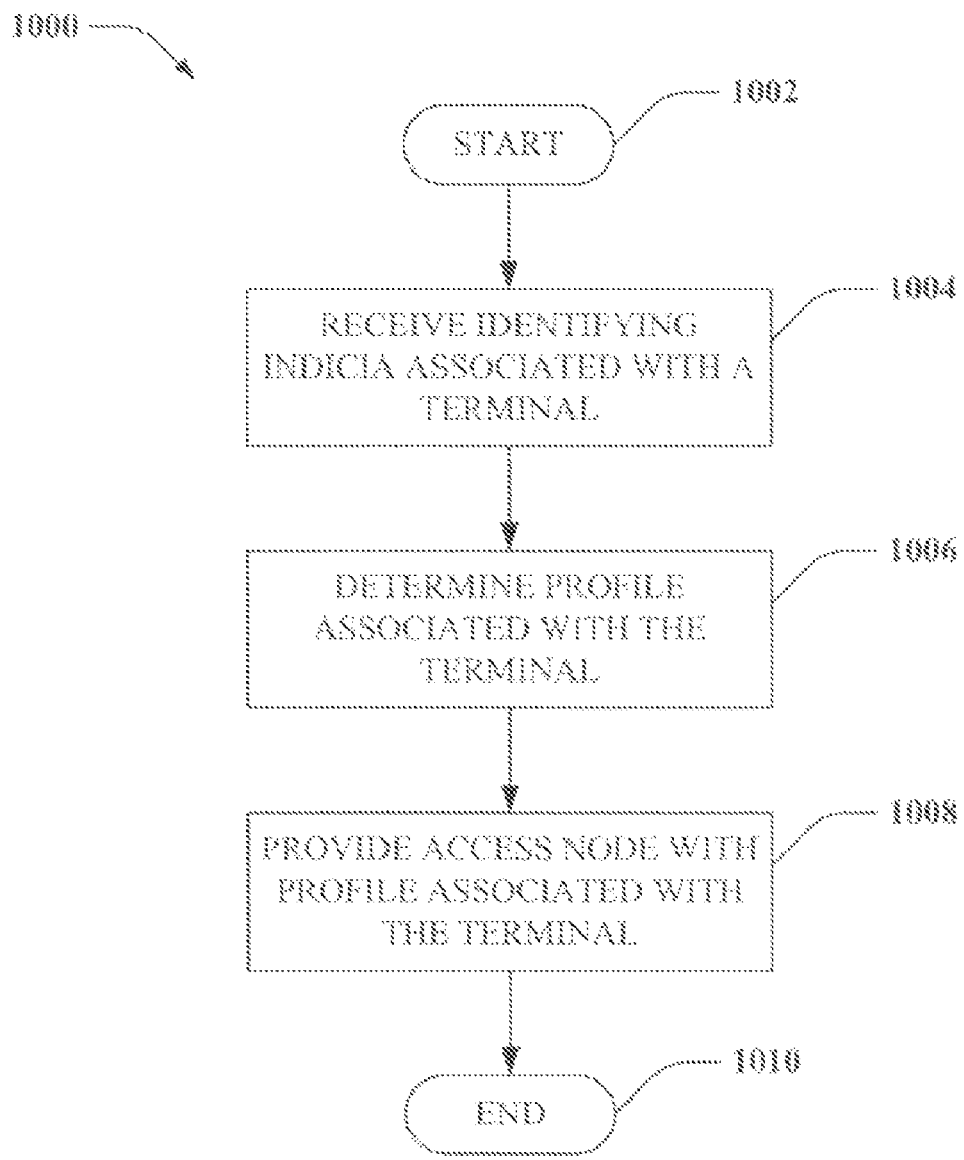
FIG. 10 is a representative flow diagram illustrating a methodology for providing an access node with a profile assigned to a wireless terminal.

Turning now to FIG. 10, a methodology 1000 for providing an access mode with a profile that is associated with a terminal is illustrated, wherein the profile includes parameters relating to QoS treatment of particular traffic flows with respect to the terminal. The methodology 1000 starts at 1002, and at 1004 identifying indicia associated with a terminal is received. For instance, such indicia can be received from an access node, which may be a base station, a router, a switch, etc. Moreover, the identifying indicia can be related to the terminal (e.g., a terminal NAI) or related to a subscriber utilizing the terminal (e.g., a subscriber NAI). Such identifying indicia can be received for at least authentication and authorization purposes (e.g., when a terminal requests access to one or more services provided by a network). At 1006, a profile associated with the terminal can be determined based at least in part upon the received identifying indicia. For example, a database can exist that enables a profile to be located based upon certain identifying indicia. The profile, as described above, can include parameters relating to QoS with respect to the identified terminal and traffic flows associated therewith. At 1008, an access node is provided with the profile that is associated with the terminal. Such access node can thereafter perform scheduling, provide bandwidth, and the like that corresponds to contents of the profile. The methodology 1000 then completes at 1010.

Figure 11:
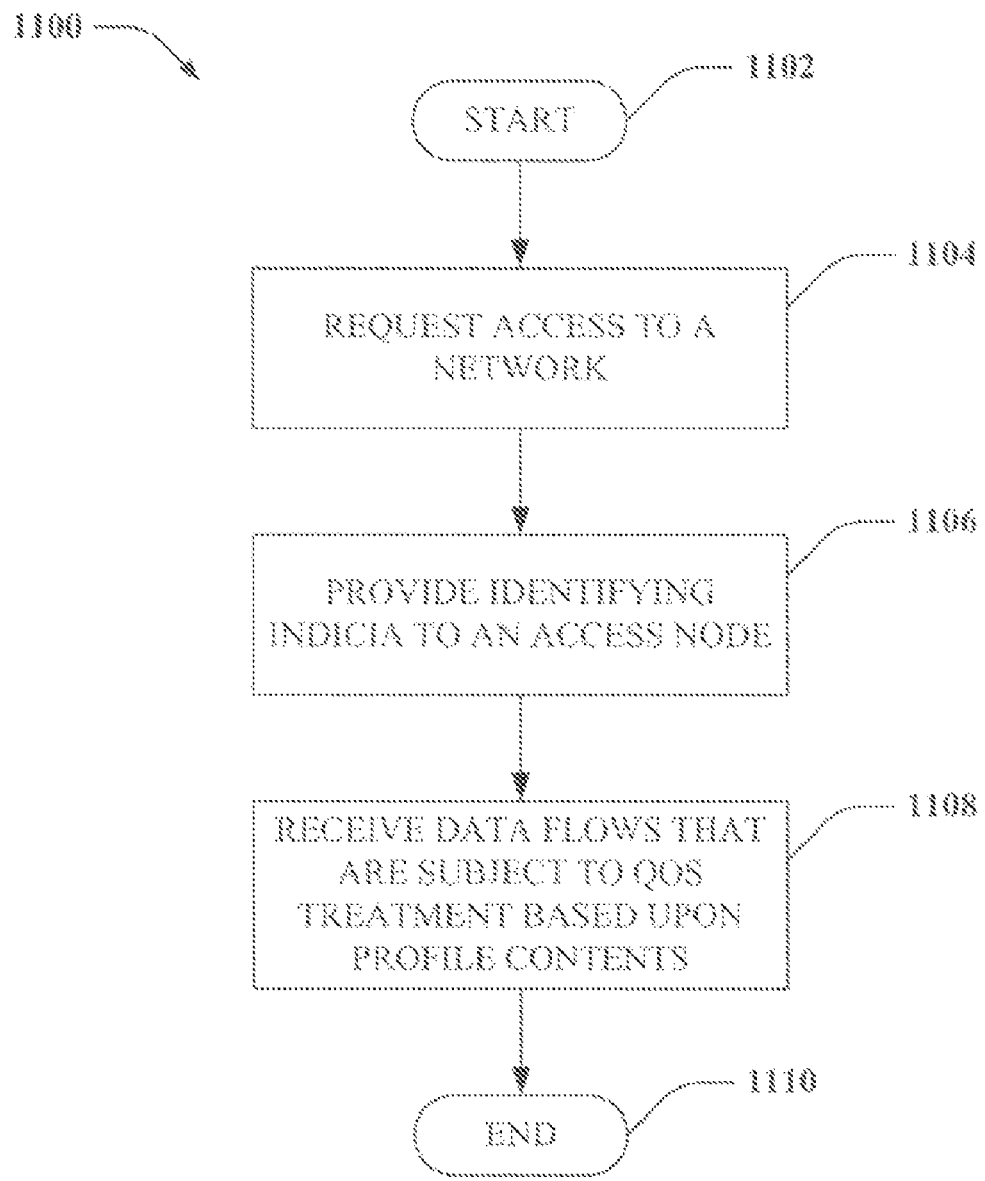
FIG. 11 is a representative flow diagram illustrating a methodology for receiving traffic flows that are subject to appropriate QoS treatment.

Referring now to FIG. 11, a methodology 1100 for receiving traffic flows that are subject to particular QoS treatment is illustrated. The methodology 1100 begins at 1102, and at 1104 access to a network is requested (e.g., access to one or more services provided by a network is requested). Such request, for instance, can be associated with a terminal (end node), such as a mobile telephone, a laptop computer, a personal digital assistant, etc. At 1106, identifying indicia is provided to an access node. Such provision can be a part of a request to access the network. The access node can be a base station, a router, a switch, and/or the like. At 1108, traffic flows are received, wherein such traffic flows are subject to QoS treatments that are defined in profile. Such profile can be provided to an access node in response to the request to access the network. While methodology 1100 describes receiving traffic flows (e.g., at an end node), it is understood that methodology 1100 can be extended to include receiving configuration information pertaining to downlink and/or uplink traffic flows and QoS treatment associated therewith as well as transmitting uplink traffic flows in accordance with prescribed QoS treatment. The methodology 1100 completes at 1110.

Figure 12:
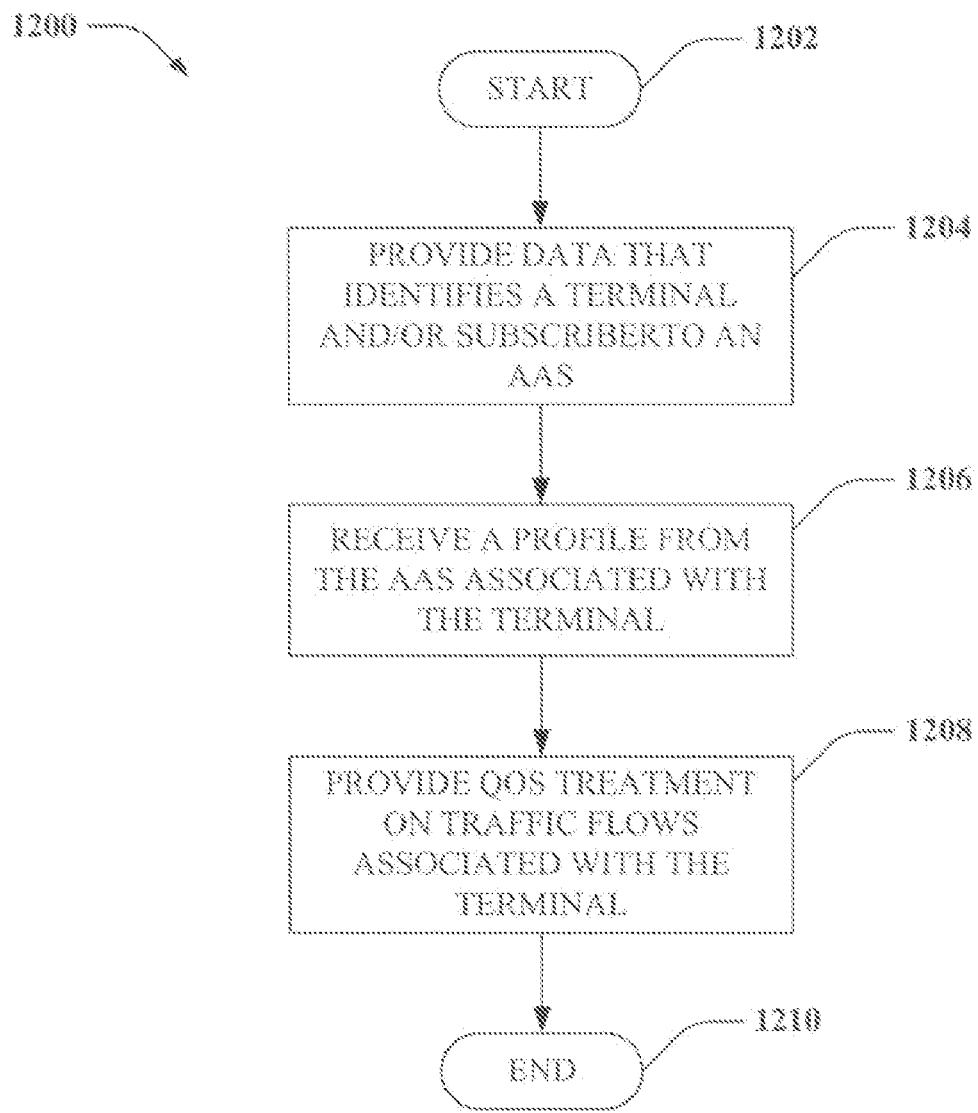
FIG. 12 is a representative flow diagram illustrating a methodology for providing appropriate QoS treatment to one or more traffic flows.

Turning now to FIG. 12, a methodology 1200 for providing appropriate QoS treatment to certain traffic flows associated with a terminal is illustrated. The methodology 1200 starts at 1202, and at 1204 data is provided to an AAS that identifies a terminal, a subscriber, and/or an application. For instance, such data can be an IMSI, an NAI, or any other suitable identifying indicia. Additionally, such data can be provided by an access node, which can relay the data from a terminal.

At 1206, a profile is received from the AAS, wherein the profile is assigned to the terminal associated with the identifying indicia. The profile can include parameters relating to QoS treatment with respect to the terminal in general, and with respect to certain traffic flows in particular. At 1208, QoS treatment is provided to traffic flows associated with the terminal. Thus, different treatment can be provided to different traffic flows related to the terminal. Moreover, appropriate QoS treatment can be provided on an uplink as well as a downlink. The methodology 1200 completes at 1010.

Figure 13:
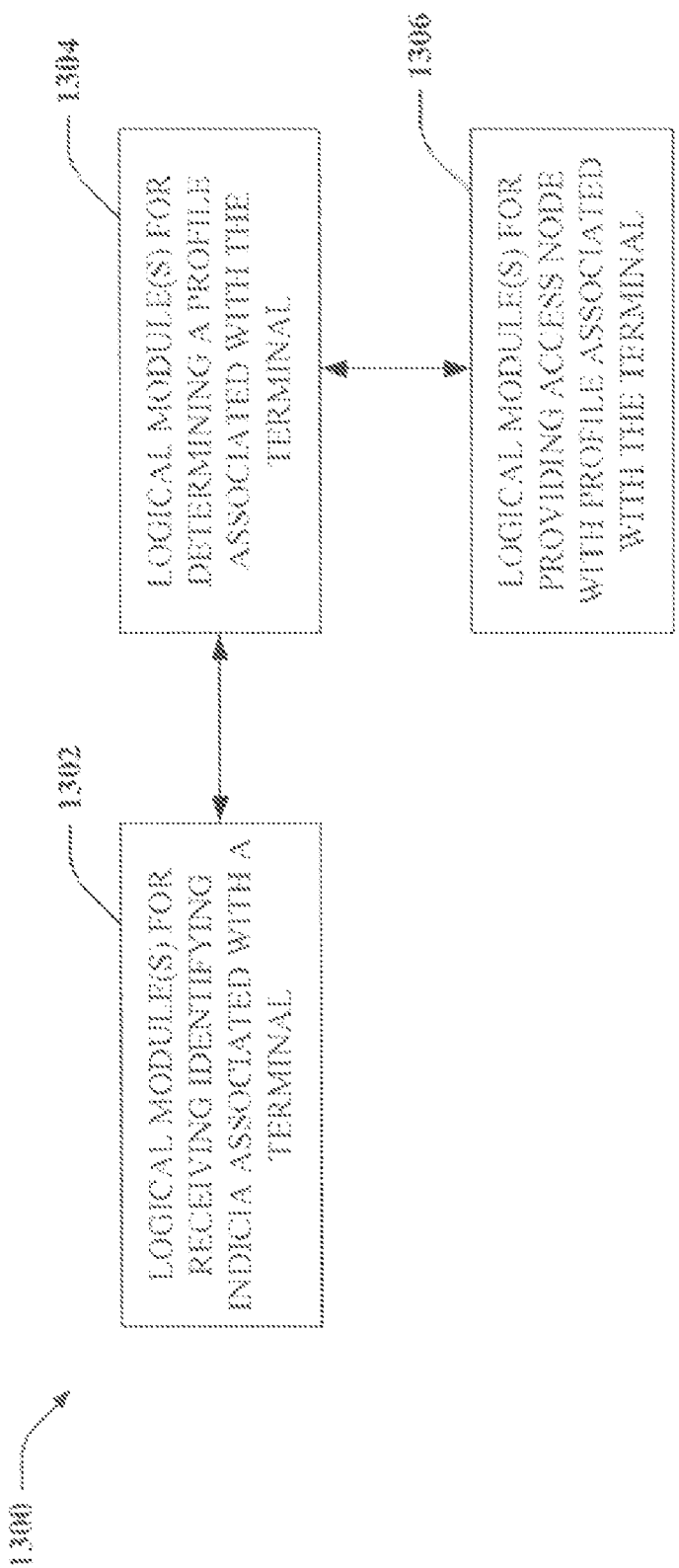
FIG. 13 is a high level block diagram of a system for providing a profile that is assigned to a terminal.
Figure 14:
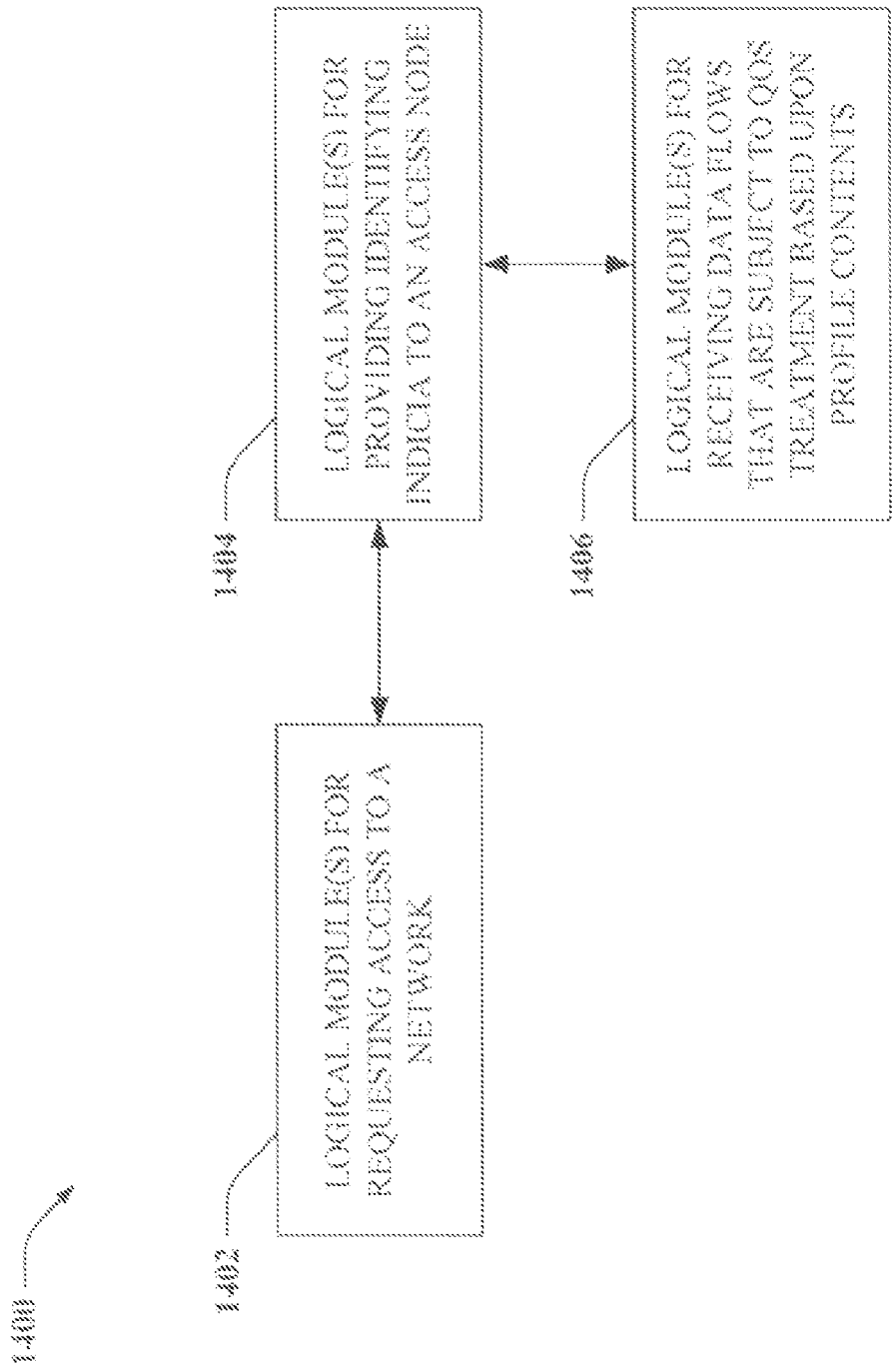
FIG. 14 is a block diagram of a system for receiving traffic flows that are subject to appropriate QoS treatment.
Figure 15:
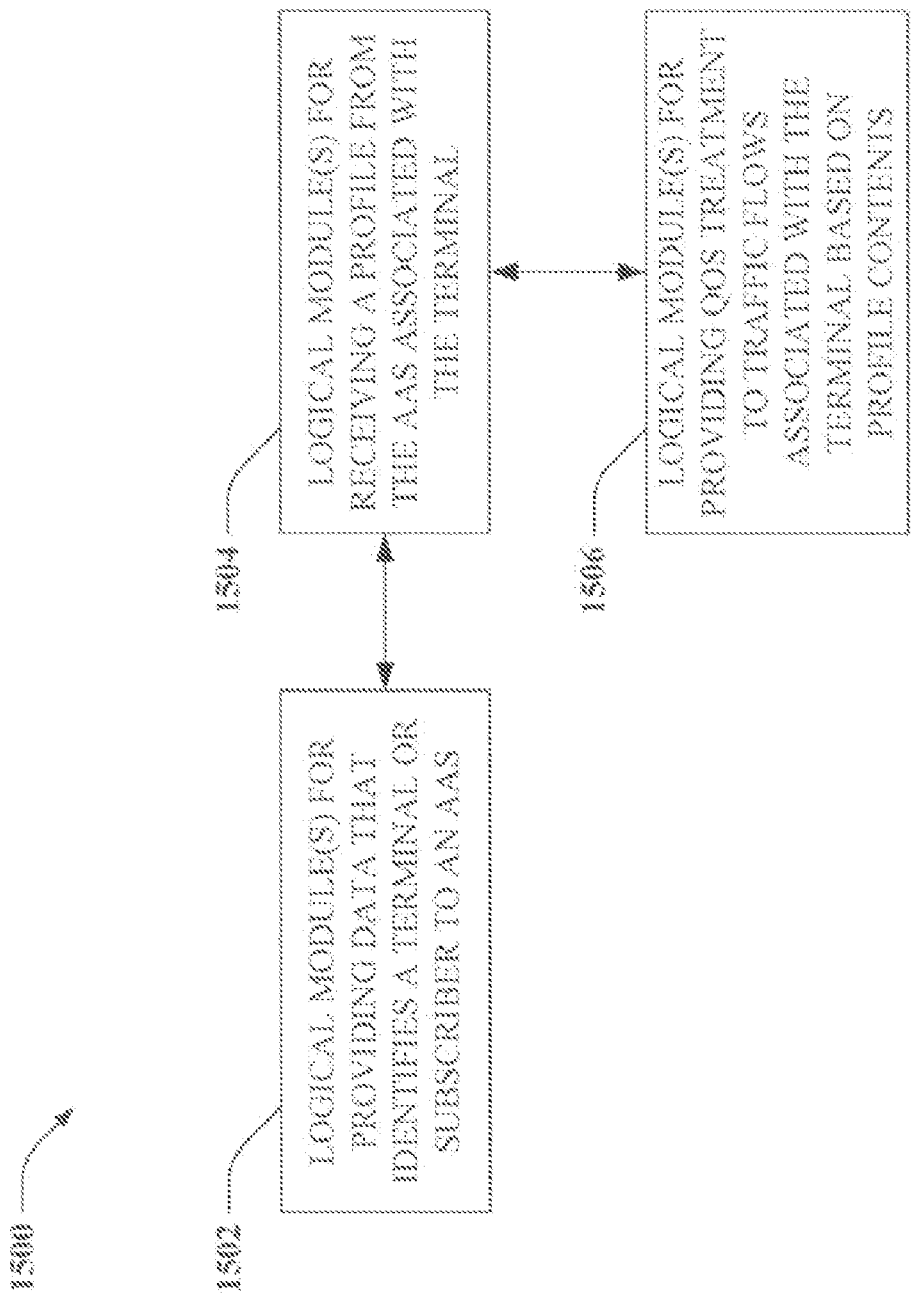
FIG. 15 is a block diagram of a system for providing appropriate QoS treatment to one or more traffic flows.

Turning now to FIGS. 13-15 collectively, systems are provided that relate to provision of particular QoS treatment with respect to a terminal and traffic flows therewith. The systems are represented as a series of interrelated functional blocks, which can represent functions implemented by a processor, software, hardware, firmware, or any suitable combination thereof. Referring specifically to FIG. 13, a system 1300 that facilitates provision of a profile to an access node is illustrated, wherein the profile includes parameters relating to QoS treatment with respect to traffic flows associated with a terminal that is communicatively coupled to the access node. System 1300 includes logical module(s) for receiving identifying indicia associated with a terminal 1302, wherein such module(s) can include one or more antennas, memory, software associated with receiving identifying indicia, a port, a cable, or any other suitable software, hardware, and/or firmware. System 1300 additionally includes logical module(s) for determining a profile associated with the identifying indicia 1304, which can include a processor, for example. Additionally, such module(s) 1304 can comprise memory, a hard drive, software, firmware, and/or the like. System 1300 also includes logical module(s) for providing an access node with the determined profile 1306 (a profile assigned to the identified terminal). Such module(s) 1306 can comprise an antenna, an Ethernet port, or any other suitable communications medium.

Now referring to FIG. 14, a system 1400 that facilitates receipt of traffic flows subject to particular QoS treatment at a terminal is illustrated. System 1400 includes logical module(s) for requesting access to a network 1402, wherein the module(s) may comprise an antenna, a processor, software, etc. System 1400 additionally includes logical module(s) for providing identifying indicia to an access node 1404, which again may include a processor, one or more antennas, a communications port, software, firmware, hardware, and the like. System further includes logical module(s) for receiving traffic flows that have been subject to QoS treatment 1406, wherein such treatment is based upon contents of a profile. Such module(s) 1406 can include, for instance, a communications port for sending/receiving data, an antenna, memory, software, hardware, firmware, etc. Again, while not shown, system 1400 can also include logical module(s) for receiving configuration information relating to provision of particular QoS treatment to one or more uplink/downlink traffic flows. Additionally, system 1400 can also include logical module(s) for transmitting uplink traffic flows that accord to QoS treatments described within a profile.

Turning not to FIG. 15, a system 1500 is illustrated that facilitates provision of QoS treatment to certain traffic flows associated with a terminal. System 1500 includes logical module(s) for providing data that identifies a terminal and/or a subscriber to an AAS 1502, which can comprise, for example, an antenna, a processor, or other suitable hardware/ software. System 1500 additionally includes logical module (s) for receiving a profile associated with the terminal from the AAS 1504, which can include a receiver chain, for instance. System 1500 further includes logical module(s) for providing QoS treatment to traffic flows that are associated with the terminal 1506, which can include a scheduling application, a processor, and/or the like.

Figure 16:
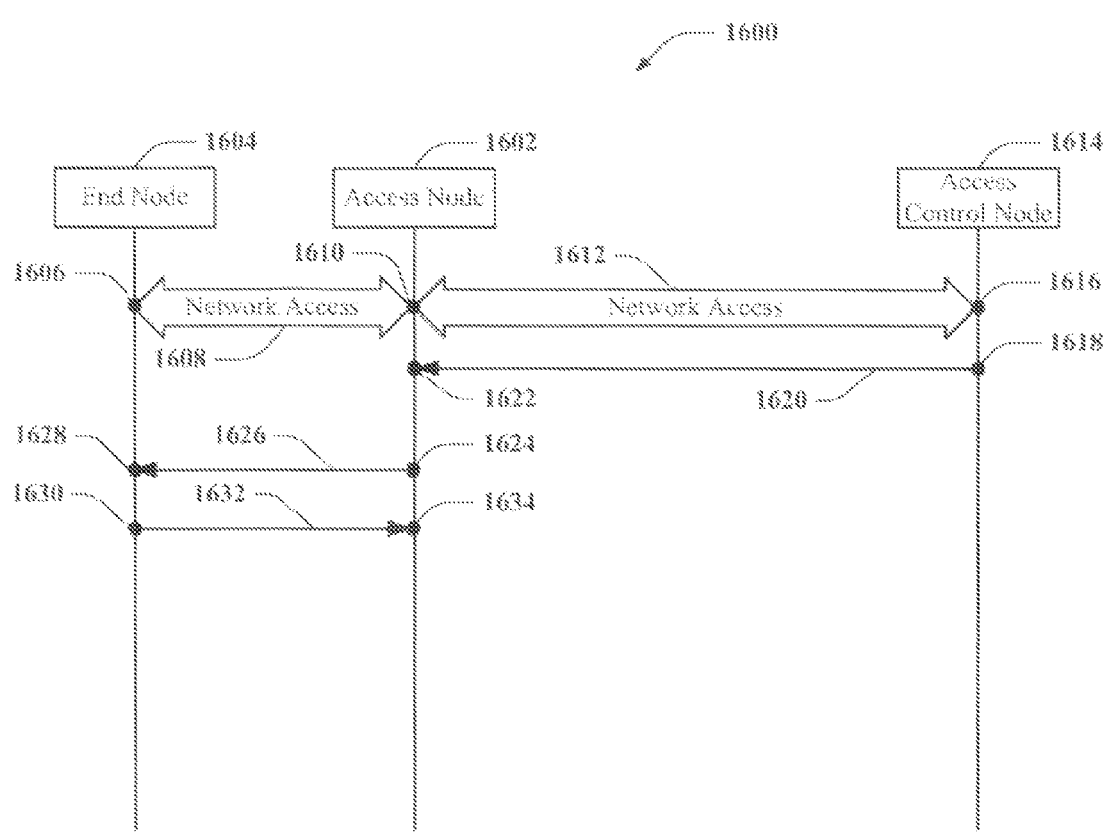
FIG. 16 is an example timing diagram illustrating authentication and configuration with respect to a wireless terminal (end node).

FIG. 16 illustrates example signaling 1600 that can be performed in connection with providing a profile to an access node 1602 (e.g., base station) when an end node (e.g., wireless terminal) 1604 is granted network access by way of access node 1602. End node 1604 at point 1606 sends a signal, part of a group of signals 1608, to access node 1602 requesting network access. Access node 1602 receives the signal, part of group of signals 1608, at point 1610 and sends another signal, part of a group of signals 1612 to an access control node (e.g., AAS server) 1614, indicating a request for network access by end node 1604. Access control node 1614 receives the signal, part of group of signals 1612, at point 1616 and performs operations as needed to determine if network access should be granted to end node 1604. End node 1604, access node 1602, and access control node 1614 can exchange additional signals as part of the groups of signals 1608 and 1612 for the purpose of controlling network access, e.g., authentication and authorization. Access control node 1614 at point 1618 sends an access grant signal 1620, e.g., message, to access node 1602, indicating that end node 1604 should be granted network access.

The access grant signal 1620 can include information pertaining to quality of service treatment, e.g., specification of traffic flow identification criteria, a traffic flow profile, service requirements and/or service constraints, for one or more traffic flows. For example, access grant signal 1620 can include a profile, as shown in FIG. 5, including a service set, as shown in FIG. 6, where the service set can include one or more service class definitions, as shown in FIG. 7, and one or more subscriber service definitions, as shown in FIG. 8. Access node 1602 receives access grant signal 1620 at point 1622 and performs operations as needed to grant network access to end node 1604 and determines the appropriate access node 1602 and end node 1604 configurations, e.g., settings for one or more adjustable modules and/or values for one or more adjustable parameters, as needed to provide quality of service to each identified traffic flow.

Access node 1602 at point 1624 can send a configuration command signal 1626, e.g., message, to end node 1604, instructing end node 1604 to implement a configuration operation corresponding to the configuration determined by access node 1602. In some embodiments, configuration command signal 1626 includes configuration information that enables end node 1604 to implement a configuration corresponding to one or more traffic flows e.g., to adjust the settings for one or more adjustable modules and/or adjust the values for one or more adjustable parameters. Configuration command signal 1626 instructs end node 1604 to, e.g., set the value of one or more internal parameters to parameter values determined by access node 1602; and/or set the value of one or more internal parameters to values determined by end node 1604 based on parameter values determined by access node 1602. End node 1604 receives configuration command signal 1626 at point 1628 and performs a configuration operation in accordance with the configuration information provided by configuration command signal 1626. End node 1604 at point 1630 sends a configuration response signal 1632 to access node 1602, indicating that the configuration changes as instructed by access node 1602 have been completed by end node 1604. Access node 1602 can receive configuration response signal 1632 at point 1634.

Figure 17:
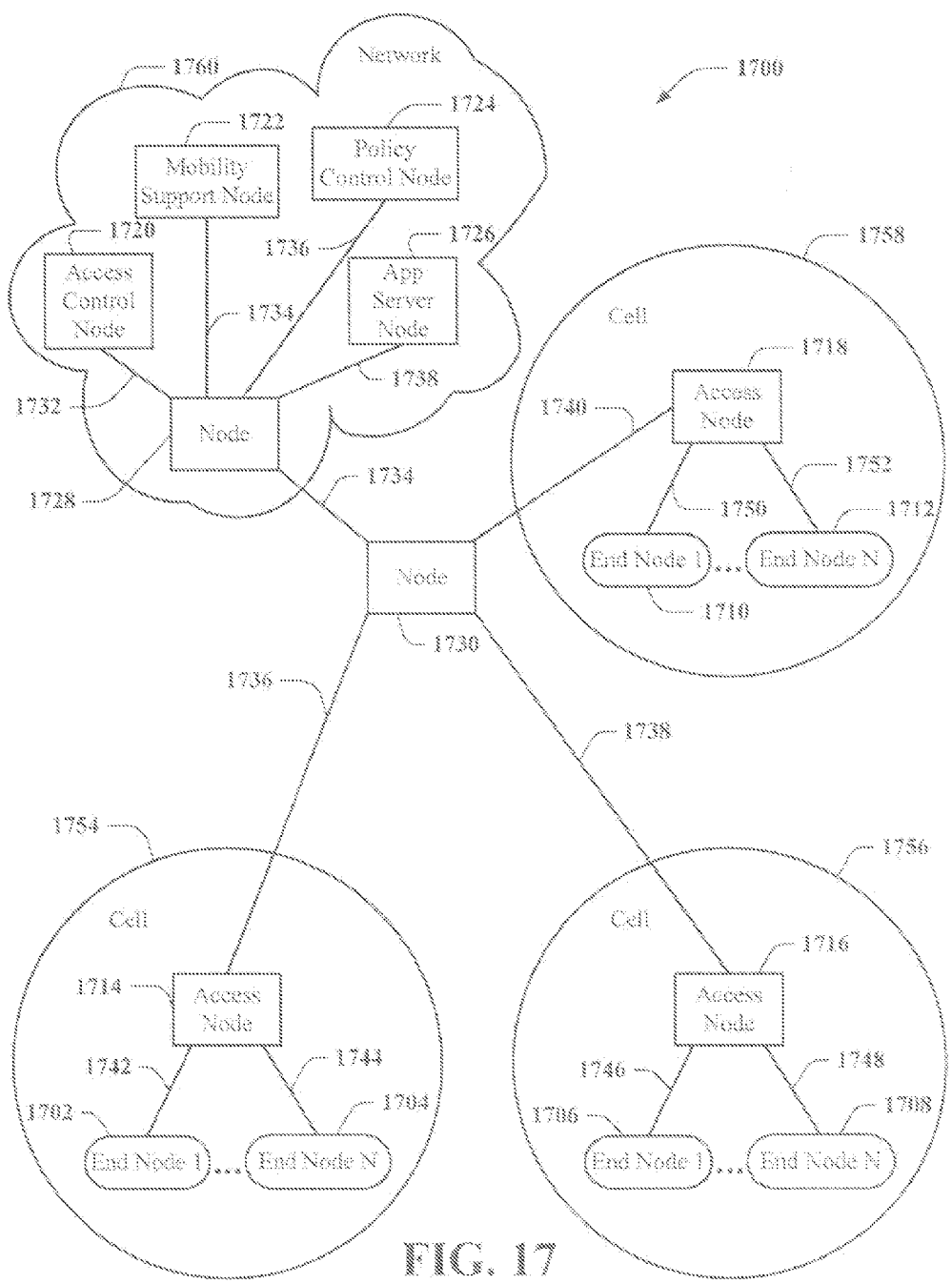
FIG. 17 illustrates an examples communications system.

To provide additional context for one or more embodiments described herein, FIG. 17 is provided to illustrate an example communication system 1700 that comprises a plurality of nodes interconnected by communications links. The system 1700 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based network). Nodes in the communication system 1700 exchange information using signals, e.g., messages, based on communication protocols, e.g., the Internet Protocol (IP). The communications links of the system 1700 may be implemented, for example, using wires, fiber optic cables, and/or wireless communications techniques. The system 1700 includes a plurality of end nodes 1702-1712, which access the communication system 1700 by way of a plurality of access nodes 1714-1718. End nodes 1702-1712 may be, e.g., wireless communication devices or terminals, and the access nodes 1714-1718 may be, e.g., wireless access routers or base stations. Communication system 1700 also includes a number of other nodes 1720-1730 that are used to provide interconnectivity or to provide specific services or functions.

Communications system 1700 depicts a network 1760 that includes access control node 1720, mobility support node 1722, policy control node 1724, and application server node 1726, all of which are connected to an intermediate network node 1728 by a corresponding network link 1732-1738, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 1732, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 1724, e.g., a policy server or Policy Decision Point (PDP), supports policy authorization for services or application layer sessions. In some embodiments, application server node 1726, e.g., a Session Initiation Protocol server, streaming media server, or other application layer server, supports session signaling for services available to end nodes and/or provides services or content available to end nodes.

Intermediate network node 1728 in network 1760 provides interconnectivity to network nodes that are external from the perspective of network 1760 by way of network link 1734. Network link 1734 is connected to intermediate network node 1730, which provides further connectivity to access nodes 1714, 1716, and 1718 by way of network links 1736-1740, respectively. Each access node 1714-1718 is depicted as providing connectivity to end nodes 1701-1712, respectively, by way of corresponding access links 1742-1752, respectively. In communication system 1700, each access node 1714-1718 is depicted as using wireless technology, e.g., wireless access links, to provide access. Wired technology may also be utilized, however, in connection with provision of access. A radio coverage area, e.g., communications cells 1754-1758 of each access node 1714-1718, is illustrated as a circle surrounding the corresponding access node.

Communication system 1700 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1700. Additionally, some of the functional entities depicted in communication system 1700 may be omitted or combined. Location or placement of these functional entities may also be varied.

Figure 18:
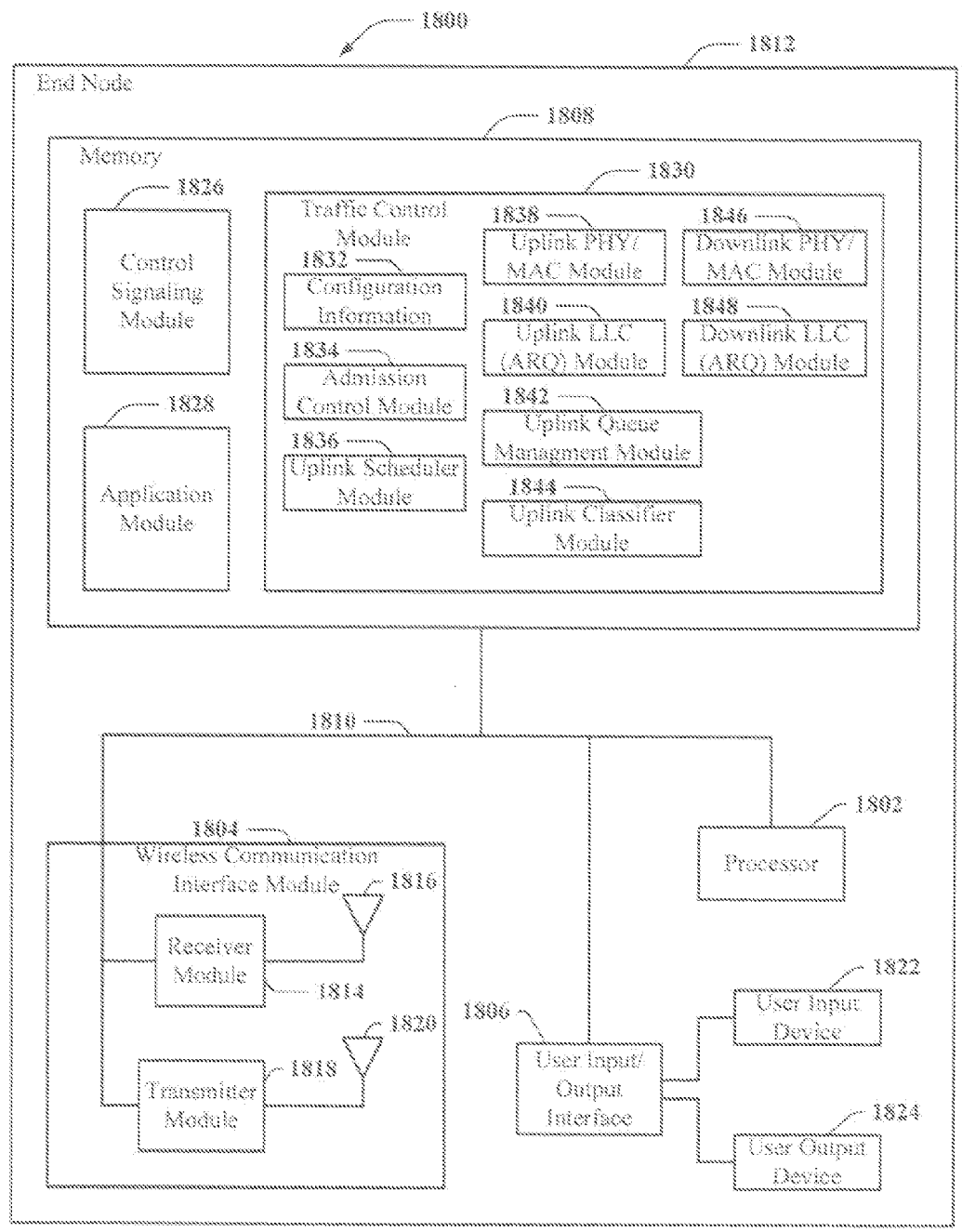
FIG. 18 illustrates an example end node.

FIG. 18 provides an illustration of an example end node 1800, e.g., wireless terminal. End node 1800 is a representation of an apparatus that may be used as any one of end nodes 1702-1712 (FIG. 17). End node 1800 includes a processor 1802, a wireless communication interface module 1804, a user input/output interface 1806 and memory 1808 coupled together by a bus 1810. Accordingly, by way of bus 1810, the various components of the end node 1800 can exchange information, signals and data. Components 1802-1808 of end node 1800 can be located inside a housing 1812.

Wireless communication interface module 1804 provides a mechanism by which the internal components of end node 1800 can send and receive signals to/from external devices and network nodes, e.g., access nodes. Wireless communication interface module 1804 includes, e.g., a receiver module 1814 with a corresponding receiving antenna 1816 and a transmitter module 1818 with a corresponding transmitting antenna 1820 used for coupling end node 1800 to other network nodes, e.g., by way of wireless communications channels.

End node 1800 also includes a user input device 1822, e.g., keypad, and a user output device 1824, e.g., display, which are coupled to bus 1810 through user input/output interface 1806. Thus, user input/output devices 1822 and 1824 can exchange information, signals and data with other components of end node 1800 by way of user input/output interface 1806 and bus 1810. User input/output interface 1806 and associated devices 1822 and 1824 provide mechanisms by which a user can operate end node 1800 to accomplish various tasks. In particular, user input device 1822 and user output device 1824 provide functionality that allows a user to control end node 1800 and applications, e.g., modules, programs, routines and/or functions, that execute in memory 1808 of end node 1800.

Processor 1802, under control of various modules, e.g., routines, included in memory 1808 controls operation of end node 1800 to perform various signaling and processing. The modules included in memory 1808 are executed on startup or as called by other modules. Modules may exchange data, information, and signals when executed. Modules may also share data and information when executed. Memory 1808 of end node 1800 includes a control signaling module 1826, an application module 1828, and a traffic control module 1830, which further includes configuration information 1832 and various additional modules.

Control signaling module 1826 controls processing relating to receiving and sending signals, e.g., messages, for controlling operation and/or configuration of various aspects of end node 1800 including, e.g., traffic control module 1830 as well as configuration information 1832 and various additional modules included. In some embodiments, control signaling module 1826 can include state information, e.g., parameters, status and/or other information, relating to operation of end node 1800 and/or one or more signaling protocols supported by control signaling module 1826. In particular, control signaling module 1826 may include configuration information, e.g., end node identification information and/or parameter settings, and operational information, e.g., information about current processing state, status of pending message transactions, etc.

Application module 1828 controls processing and communications relating to one or more applications supported by end node 1800. In some embodiments, application module 1828 processing can include tasks relating to input/output of information by way of the user input/output interface 1806, manipulation of information associated with an application, and/or receiving or sending signals, e.g., messages, associated with an application. In some embodiments, application module 1828 includes state information, e.g., parameters, status and/or other information, relating to operation of one or more applications supported by application module 1828. In particular, application module 1828 may include configuration information, e.g., user identification information and/or parameter settings, and operational information, e.g., information about current processing state, status of pending responses, etc. Applications supported by application module 1828 include, e.g., Voice over IP (VoIP), web browsing, streaming audio/video, instant message, file sharing, gaming, etc.

Traffic control module 1830 controls processing relating to receiving and sending data information, e.g., messages, packets, and/or frames, through wireless communication interface module 1804. The example traffic control module 1830 includes configuration information 1832 as well as various additional modules that control various aspects of QoS for packets and/or traffic flows, e.g., associated sequences of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 1830 follows.

An admission control module 1834 maintains information relating to resource utilization/availability and determines if sufficient resources are available to support QoS parameters desirably associated with particular traffic flows. Resource availability information maintained by admission control module 1834 includes, e.g., packet and/or frame queuing capacity, schedule capacity, as well as processing and memory capacity needed to support one or more traffic flows. Control signaling module 1826, application module 1828, and/or other modules included in end node 1800 may query admission control module 1834 to determine if sufficient resources are available to support a new or modified traffic flow, where the admission control determination is a function of QoS parameters of the particular traffic flow and QoS parameters defined within a profile. Configuration information 1832 can include configuration information, e.g., parameters settings, that affect the operation of admission control module 1834, e.g., an admission control threshold value that indicates percentage of resource that may be allocated prior to rejecting additional requests.

An uplink scheduler module 1836 controls processing relating to transmission scheduling, e.g., order and/or timing, and allocation of transmission resources, e.g., information coding rate, transmission time slots, and/or transmission power, for data information, e.g., messages, packets, and/or frames, to be sent by way of wireless communication interface module 1804, e.g., from end node 1800 to an access node. Uplink scheduler module 1836 can schedule transmissions and allocate transmission resources as a function of QoS parameters associated with one or more traffic flows. In some embodiments, scheduling and/or resource allocation operations performed by uplink scheduler module 1836 are additionally a function of channel conditions and other factors, e.g., power budget.

An uplink PHY/MAC module 1838 controls physical (PHY) layer and Media Access Control (MAC) layer processing relating to sending data information, e.g., messages, packets, and/or frames, by way of wireless communication interface module 1804, e.g., from end node 1800 to an access node. For instance, operation of uplink PHY/MAC module 1838 includes both sending and receiving control information, e.g., signals or messages, to coordinate sending of data information, e.g., messages, packets, and/or frames. Configuration information 1832 can include configuration information, e.g., parameters settings, that affect the operation of uplink PHY/MAC module 1838, e.g., a frequency, band, channel, spreading code or hoping code to be used for transmissions, an identifier associated with end node 1800, a request dictionary prescribing use of an assignment request channel, etc.

An uplink LLC (ARQ) module 1840 controls Logical Link Control (LLC) layer processing relating to sending data information, e.g., messages, packets, and/or frames, through wireless communication interface module 1804, e.g., from end node 1800 to an access node. Uplink LLC (ARQ) module 1840 includes processing associated with Automatic Repeat Request (ARQ) capabilities, e.g., retransmission of lost packets or frames. Uplink LLC (ARQ) module 1840 can, for instance, further include processing relating to addition of an LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 1840 can additionally perform fragmentation of higher layer messages, e.g., packets, into multiple sub-portions, e.g., frames to be sent by uplink PHY/MAC module 1840. Configuration information 1832 can include configuration information that affect operation of uplink LLC (ARQ) module 1840, e.g., an ARQ window size, maximum number of retransmissions, a discard timer, etc.

An uplink queue management module 1842 maintains information and controls processing relating to storage of data information to be send by way of wireless communication interface module 1804, e.g., from end node 1800 to an access node. Uplink queue management module 1842 can, for example, control storage of data information awaiting transmission and maintain state information regarding data information awaiting transmission on a per traffic flow basis, e.g., packets associated with each traffic flow may be stored in separate queues. For instance, uplink queue management module 1842 supports a variety of queue management techniques and/or capabilities, e.g., head drop, tail drop, as well as various Active Queue Management (AQM) mechanisms such as Random Early Detection (RED). Configuration information 1832 can include configuration information that affects operation of uplink queue management module 1842, such as a queue limit, drop strategy, and/or AQM thresholds associated with one or more traffic flows.

An uplink classifier module 1844 controls processing relating to identification of data information as belonging to particular traffic flows prior to being sent by way of the wireless communication interface module 1804, e.g., from end node 1800 to an access node. In some embodiments, messages, packets, and/or frames to be sent through utilization of wireless communication interface module 1804 are classified as belonging to one of a variety of traffic flows by uplink classifier module 1844 based on inspection of one or more header and/or payload fields. Results of classification by uplink classifier module 1844 can affect the treatment of classified data information by uplink queue management module 1842 as well as other modules within memory 1808. For example, the results may determine a particular queue the message, packet, and/or frame will be associated with for storage and further affect subsequent processing such as scheduling. Configuration information can include configuration information that affect operation of uplink classifier module 1844, e.g., a set of one or more classifier filter rules that prescribe criteria used to associate data information, e.g., messages, packets, and/or frames, as belonging to one or more traffic flows.

A downlink PHY/MAC module 1846 controls PHY layer and MAC layer processing relating to receiving data information by way of wireless communication interface module 1804. Operation of downlink PHY/MAC module 1846 can include both sending and receiving control information to coordinate receiving of data information. Configuration information 1804 can include configuration information that affect operation of downlink PHY/MAC module 1846, e.g., a frequency, band, channel, spreading code or hoping code to be used for reception, an identifier associated with end node 1800, etc.

A downlink LLC (ARQ) module 1848 controls LLC layer processing relating to receiving data information by way of wireless communication interface module 1804. Downlink LLC (ARQ) module 1848 includes processing associated with ARQ capabilities, e.g., retransmission of lost packets or frames. For example, downlink LLC (ARQ) module 1848 can further include processing relating to an LLC header and/or trailer that encapsulates higher layer messages, which provides additional functionality, e.g., multi-protocol multiplexing/demultiplexing through a type field or error detection by way of a checksum field. Downlink LLC (ARQ) module 1848 can also perform reassembly of frames received by the downlink PHY/MAC module 1846 into higher layer messages. Configuration information 1832 can, and in some embodiments does, include configuration information, e.g., parameters settings, that affect operation of downlink LLC (ARQ) module 1848, e.g., an ARQ window size, maximum number of retransmission, a discard timer, etc.

Figure 19:
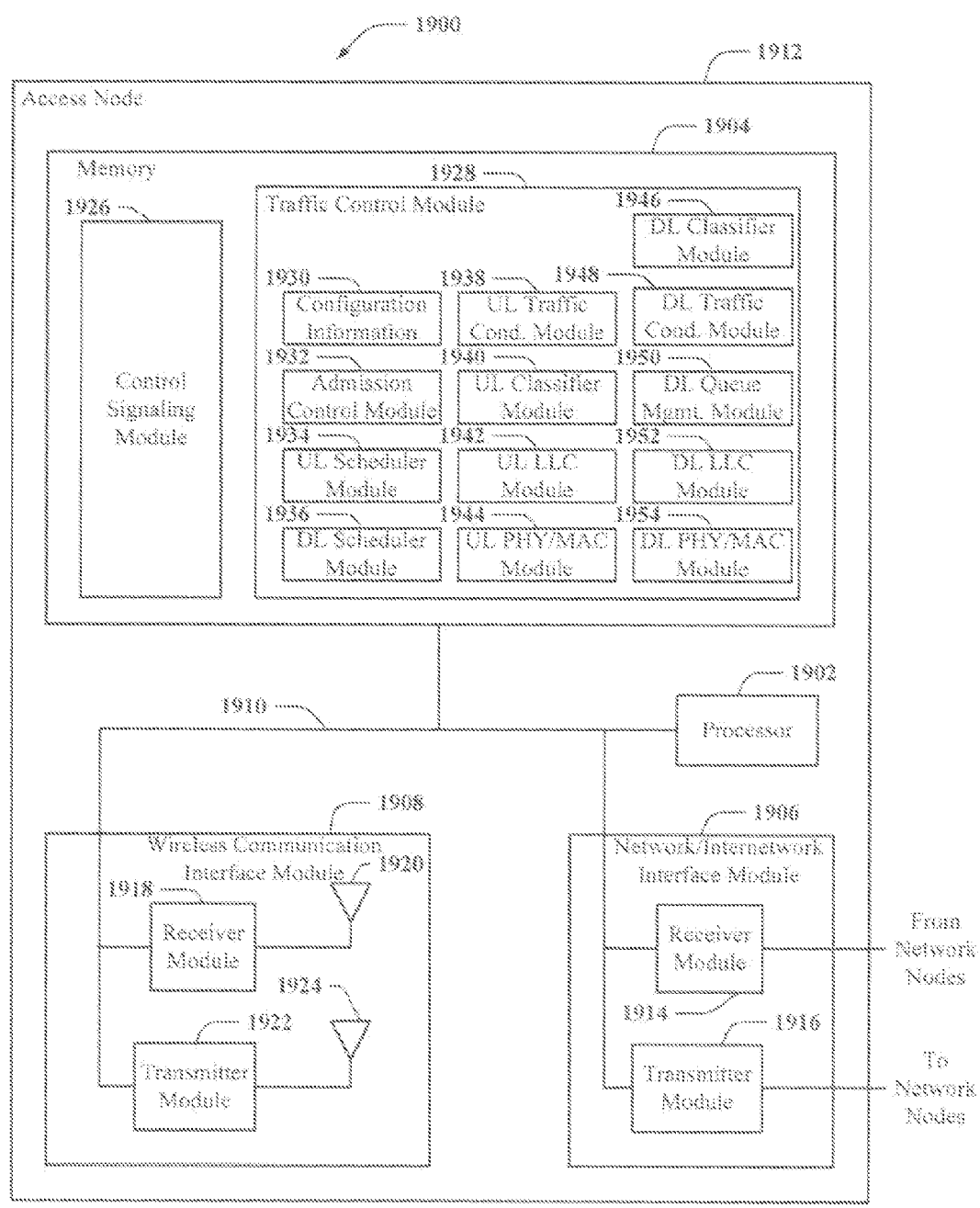
FIG. 19 illustrates an example access node.

FIG. 19 provides a detailed illustration of an example access node 1900 implemented in accordance with the present invention. The access node 1900 is a detailed representation of an apparatus that may be used as any one of the access nodes 1714-1718 depicted in FIG. 17. In the FIG. 19 embodiment, access node 1900 includes a processor 1902, memory 1904, a network/internetwork interface module 1906 and a wireless communication interface module 1908, coupled together by bus 1910. Accordingly, by way of bus 1910 the various components of access node 1900 can exchange information, signals and data. The components 1902-1910 of access node 1900 are located inside a housing 1912.

Network/internetwork interface module 1906 provides a mechanism by which the internal components of access node 1900 can send and receive signals to/from external devices and network nodes. Network/internetwork interface module 1906 includes a receiver module 1914 and a transmitter module 1916 used for coupling node 1900 to other network nodes, e.g., through copper wires or fiber optic lines. Wireless communication interface module 1908 also provides a mechanism by which the internal components of access node 1900 can send and receive signals to/from external devices and network nodes, e.g., end nodes. Wireless communication interface module 1908 includes, e.g., a receiver module 1918 with a corresponding receiving antenna 1920 and a transmitter module 1922 with a corresponding transmitting antenna 1924. Wireless communication interface module 1908 is used for coupling access node 1900 to other nodes, e.g., by way of wireless communication channels.

Processor 1902 under control of various modules, e.g., routines, included in memory 1904 controls operation of access node 1900 to perform various signaling and processing. The modules included in memory 1904 are executed on startup or as called by other modules. Modules may exchange data, information, and signals when executed. Modules may also share data and information when executed. In the FIG. 19 embodiment, memory 1904 of access node 1900 includes a control signaling module 1926 and a traffic control modules 1928, which further includes configuration information 1930 and various additional modules 1932-1954.

Control signaling module 1926 controls processing relating to receiving and sending signals, e.g., messages, for controlling operation and/or configuration of various aspects of access node 1900 including, e.g., traffic control module 1928 as well as configuration information 1930 and the various additional modules included therein 1932-1954. For instance, control signaling module 1926 includes state information, e.g., parameters, status and/or other information, relating to operation of access node 1900 and/or one or more signaling protocols supported by control signaling module 1926. In particular, control signaling module 1926 may include configuration information, e.g., access node identification information and/or parameter settings, and operational information, e.g., information about current processing state, status of pending message transactions, etc.

Traffic control module 1928 controls processing relating to receiving and sending data information, e.g., messages, packets, and/or frames, by way of wireless communication interface module 1908. For instance, traffic control module can include configuration information 1930 as well as various additional modules 1932-1954 that control various aspects of quality of service for packets and/or traffic flows, e.g., associated sequences of packets. In some embodiments, traffic control module 1928 includes state information, e.g., parameters, status and/or other information, relating to operation of access node 1900, traffic control module 1928, and/or one or more of the various additional modules included therein 1932-1954. Configuration information 1930, e.g., parameter settings, determines, affects and/or prescribes operation of traffic control module 1928 and/or the various additional modules included therein 1932-1954. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 1928 follows.

Admission control module 1932 maintains information relating to resource utilization/availability and determines if sufficient resources are available to support quality of service requirements of particular traffic flows. Resource availability information maintained by admission control module 1932 includes, e.g., packet and/or frame queuing capacity, scheduling capacity, as well as processing and memory capacity needed to support one or more traffic flows. Control signaling module 1926 and/or other modules included in access node 1900 can query admission control module 1932 to determine if sufficient resources are available to support a new or modified traffic flow, where the admission control determination is a function of the quality of service requirements of the particular traffic flow and/or the available resources. Configuration information 1930 can include configuration information, e.g., parameters settings, that affect the operation of admission control module 1932, e.g., an admission control threshold value that indicates the percentage of resource that may be allocated prior to rejecting addition requests.

Uplink scheduler module 1934 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node by way of wireless interface module 1908. Uplink scheduler module 1934 can schedule transmissions and allocate transmission resources as a function of the quality of service requirements and/or constraints associated with one or more traffic flows and/or one or more end nodes. Configuration information 1930 can include configuration information that affect the operation of uplink scheduler module 1934, e.g., a priority, rate bound, latency bound, and/or sharing weight associated with one or more traffic flows and/or end nodes. In some embodiments, scheduling and/or resource allocation operations performed by uplink scheduler module 1934 are additionally a function of channel conditions and other factors, e.g., power budget.

Downlink scheduler module 1936 controls processing relating to transmission scheduling, e.g., order and/or timing, and allocation of transmission resources, e.g., information coding rate, transmission time slots, and/or transmission power, for data information, e.g., messages, packets, and/or frames, to be sent from access node 1900 to one or more end nodes through wireless interface module 1908. Downlink scheduler module 1936 can schedule transmissions and allocate transmission resources as a function of the quality of service requirements and/or constraints associated with one or more traffic flows and/or one or more end nodes. Configuration information 1930 can include configuration information that affects the operation of downlink scheduler module 1936, e.g., a priority, rate bound, latency bound, and/or sharing weight associated with one or more traffic flows and/or end nodes. In some embodiments, scheduling and/or resource allocation operations performed by the downlink scheduler module 1936 are additionally a function of channel conditions and other factors, e.g., power budget.

Uplink traffic conditioner module 1938 control processing relating to traffic conditioning, e.g., metering, marking, policing, etc., for data information, e.g., messages, packets, and/or frames, received by way of wireless interface module 1908, e.g., from an end node to access node 1900. Uplink traffic conditioner module 1938 can condition traffic, e.g., meter, mark and/or police, as a function of the quality of service requirements and/or constraints associated with one or more traffic flows and/or one or more end nodes. Configuration information 1930 can include configuration information that affects the operation of uplink traffic conditioner module 1938, e.g., a rate bound, and/or marking value associated with one or more traffic flows and/or end nodes.

Uplink classifier module 1940 controls processing relating to identification of data information, e.g., messages, packets, and/or frames, received through wireless interface module 1908, e.g., from an end node to access node 1900, as belonging to particular traffic flows prior to being processed by uplink traffic conditioner module 1938. In some embodiments, messages, packets, and/or frames received through wireless communication interface module 1908 are classified as belonging to one of a variety of traffic flows by uplink classifier module 1940 based on inspection of one or more header and/or payload fields. The results of classification by uplink classifier module 1940 can affect the treatment of the classified data information, e.g., messages, packets, and/or frames, by uplink traffic conditioner module 1938, e.g., the results may determine a particular data structure or state machine the message, packet, and/or frame will be associated with and further affect subsequent processing such as metering, marking, and/or policing. Configuration information 1930 can include configuration information that affects the operation of uplink classifier module 1940, e.g., a set of one or more classifier filter rules that prescribe criteria used to associate data information, e.g., messages, packets, and/or frames, as belonging to one or more traffic flows.

Uplink LLC (ARQ) module 1942 controls LLC layer processing relating to receiving data information, e.g., packets and/or frames, by way of wireless communication interface module 1908, e.g., from an end node to access node 1900. Uplink LLC (ARQ) module 1942 includes processing associated with ARQ capabilities, e.g., retransmission of lost packets or frames. In some embodiments, uplink LLC (ARQ) module 1942 further includes processing relating to an LLC header and/or trailer that encapsulates higher layer messages, e.g., packets, which provides additional functionality, e.g., multi-protocol multiplexing/demultiplexing through a type field or error detection by way of a checksum field. Uplink LLC (ARQ) module 1942 can also perform reassembly of frames received by uplink PHY/MAC module 1944 into higher layer messages, e.g., packets. The configuration information 1930 can include configuration information that affects the operation of uplink LLC (ARQ) module 1942, e.g., an ARQ window size, maximum number of retransmissions, a discard timer, etc.

Uplink PHY/MAC module 1944 controls PHY layer and MAC layer processing relating to receiving data information, e.g., packets and/or frames, by way of wireless communication interface module 1908, e.g., from an end node to access node 1900. In some embodiments, operation of uplink PHY/MAC module 1944 includes both sending and receiving control information, e.g., signals or messages, to coordinate receiving of data information, e.g., messages, packets, or frames. Configuration information 1930 can include configuration information that affects the operation of uplink PHY/MAC module 1944, e.g., a frequency, band, channel, spreading code or hopping code to be used for reception, an identifier associated with access node 1900, etc.

Downlink classifier module 1946 controls processing relating to identification of data information, e.g., messages, packets, and/or frames, as belonging to particular traffic flows prior to being sent through wireless communication interface module 1908, e.g., from access node 1900 to an end node. In some embodiments, messages, packets, and/or frames to be sent by way of wireless communication interface module 1908 are classified as belonging to one of a variety of traffic flows by downlink classifier module 1946 based on inspection of one or more header and/or payload fields. The results of classification by downlink classifier module 1946 can affect the treatment of the classified data information, e.g., messages, packets, and/or frames, by downlink queue management module 1950 and other modules 1948, 1952, and 1954, e.g., the results may determine a particular queue the message, packet, and/or frame will be associated with for storage and further affect subsequent processing such as scheduling. Configuration information 1930 can include configuration information, e.g., parameters settings, that affect the operation of downlink classifier module 1946, e.g., a set of one or more classifier filter rules that prescribe criteria used to associate data information, e.g., messages, packets, and/or frames, as belonging to one or more traffic flows.

Downlink traffic conditions module 1948 controls processing relating to traffic conditioning, e.g., metering, marking, policing, etc., for data information, e.g., messages, packets, and/or frames, to be sent by way of wireless interface module 1908, e.g., from access node 1900 to an end node. Downlink traffic conditioner module 1948 can condition traffic, e.g., meter, mark and/or police, as a function of the quality of service requirements and/or constraints associated with one or more traffic flows and/or one or more end nodes. Configuration information 1930 can include configuration information that affects the operation of downlink traffic conditioner module 1948, e.g., a rate bound, and/or making value associated with one or more traffic flows and/or end nodes.

Downlink queue management module 1950 maintains information and controls processing relating to storage of data information, e.g., messages, packets, and/or frames, to be sent by way of wireless communication interface module 1908, e.g., from access node 1900 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 1950 supports a variety of queue management techniques and/or capabilities, e.g., head drop, tail drop, as well as various AQM mechanisms such as RED. Configuration information 1930 can include configuration information that affects the operation of downlink queue management module 1950, e.g., a queue limit, drop strategy, and/or AQM thresholds associated with one or more traffic flows.

Downlink LLC (ARQ) module 1952 controls LLC layer processing relating to sending data information, e.g., messages, packets, and/or frames, by way of wireless communication interface module 1908, e.g., from access node 1900 to an end node. Downlink LLC (ARQ) module 1952 includes processing associated with ARQ capabilities, e.g., retransmission of lost packets or frames. In some embodiments, downlink LLC (ARQ) module 1952 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 1952 can also perform fragmentation of higher layer messages, e.g., packets, into multiple sub-portions, e.g., frames to be sent by downlink PHY/MAC module 1954. Configuration information 1930 can include configuration information that affects the operation of downlink LLC (ARQ) module 1952, e.g., an ARQ window size, maximum number of retransmissions, a discard timer, etc.

Downlink PHY/MAC module 1954 controls PHY layer and MAC layer processing relating to sending data information, e.g., messages, packets, and/or frames, by way of wireless communication interface module 1908, e.g., from access node 1900 to an end node. In some embodiments, operation of downlink PHY/MAC module 1954 includes both sending and receiving control information, e.g., signals or messages, to coordinate sending of data information, e.g., messages, packets, or frames. Configuration information 1930 can include configuration information that affects the operation of downlink PHY/MAC module 1954, e.g., a frequency, band, channel, spreading code or hoping code to be used for transmissions, an identifier associated with the access node 1900, etc.

Figure 20:
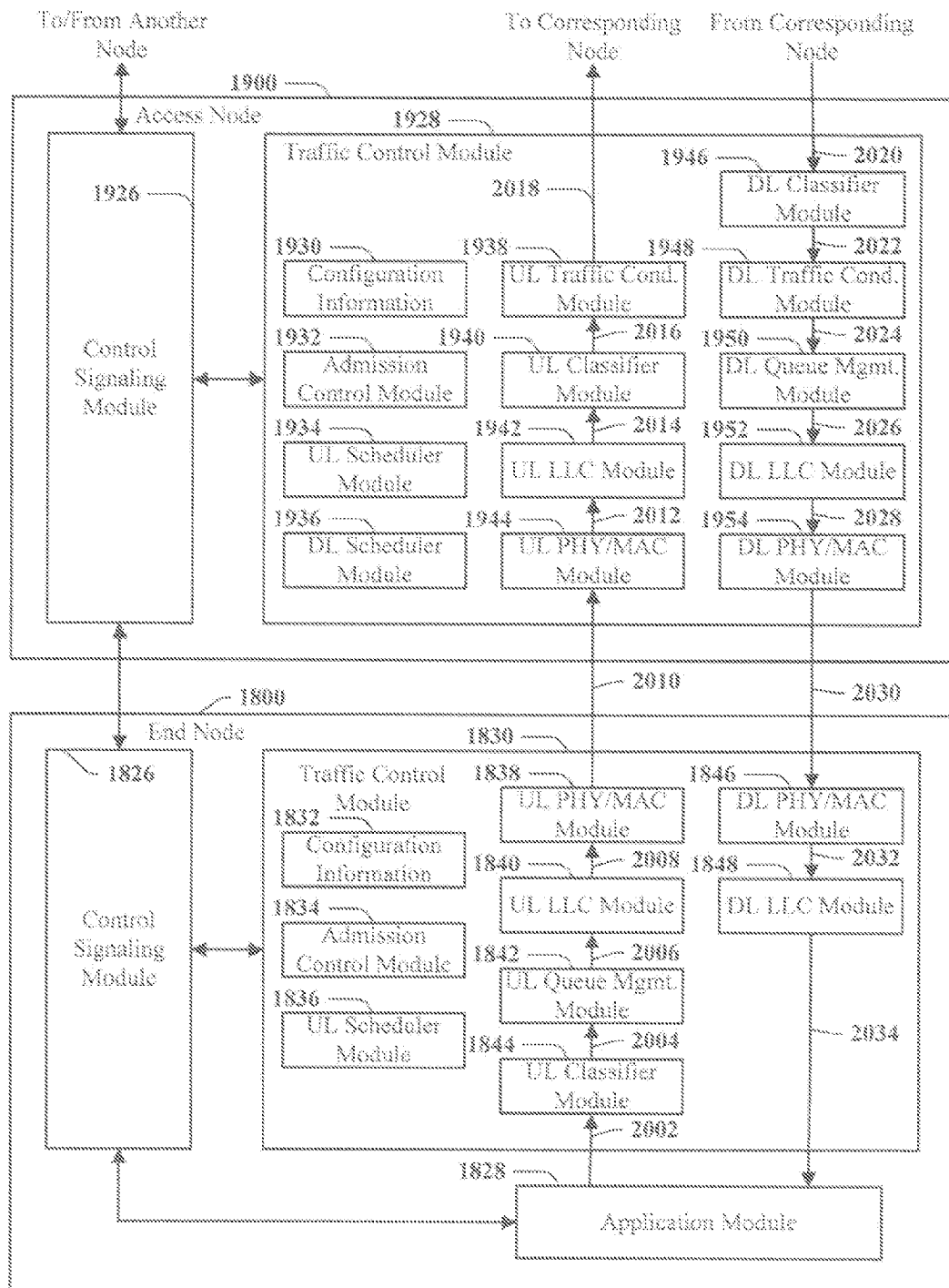
FIG. 20 illustrates an example end node communicating with an example access node.

FIG. 20 illustrates example signaling and traffic flows between various modules included in example end node 1800 and example access node 1900. The FIG. 20 end node 1800 and FIG. 20 access node 1900 are simplified representations of the FIG. 18 end node 1800 and FIG. 19 access node 1900, respectively. The FIG. 20 example shows application module 1828 sending and receiving data information, e.g., traffic flows comprising a sequence of messages, packets, or frames. In the context of the FIG. 17 example system, the FIG. 20 end node 1800 may be any one of end nodes 1702-1712 depicted in FIG. 17 and the application module 1828 included in the FIG. 20 end node 1800 may be exchanging data information with another node in the system, e.g., another end node 1702-1712 or the application server node 1726 as depicted in FIG. 17. In FIG. 20 and the subsequent description, the node with which the FIG. 20 end node 1800 is exchanging data information is referred to as the corresponding node.

The data information, e.g., traffic flows comprising a sequence of messages, packets, or frames, sent from the application module 1828 in the end node 1800 to a corresponding node is shown by a sequence of arrows 2002-2008 to proceed through a sequence of modules 1838-1844 included in end node 1800 for processing, after which the data information is sent from the end node 1800 to the access node 1900, e.g., by way of wireless communication interface module 1804. Following reception by access node 1900, e.g., by way of wireless communication interface module 1908, the data information, e.g., traffic flows comprising a sequence of messages, packets, or frames, sent from the application module 1828 in end node 1800 to the corresponding node is shown by a sequence of arrows 2010-2018 to proceed through a sequence of modules 1938-1944 included in access node 1900 for processing, prior to being forwarded from the access node 1900 toward the corresponding node, e.g., directed in accordance with routing information to an intermediate node connected to the access node by way of network/internetwork interface module 1906.

The data information, e.g., traffic flows comprising a sequence of messages, packets, or frames, sent from a corresponding node to application module 1828 in end node 1828 is shown by a sequence of arrows 2020-2028 to be received by access node 1900, e.g., by way of network/internetwork interface module 1906, and then to proceed through a sequence of modules 1946-1954 included in access node 1900 for processing, after which the data information is sent from the access node 1900 to the end node 1800, e.g., via the wireless communication interface module 1908. Following reception by end node 1800, e.g., by way of wireless communication interface module 1804, the data information, e.g., traffic flows comprising a sequence of messages, packets, or frames, sent from the corresponding node to application module 1828 in end node 1800 is shown by a sequence of arrows 2030-2034 to proceed through a sequence of modules 1846 and 1848 included in end node 1800 for processing, prior to being delivered to the application module 1828 in end node 1800.

In addition to the exchange of data information, e.g., traffic flows, FIG. 20, also depicts the exchange of control information, e.g., signaling flows and/or communication interfaces. In particular, the FIG. 20 example depicts the exchange of control information between control signaling module 1926 and traffic control module 1928 included in access node 1900. Similarly, the FIG. 20 example depicts the exchange of control information between control signaling module 1826 and the traffic control module 1830 included in the end node 1800. In both access node 1900 and end node 1800, exchange of control information between the modules as shown allows the respective control signaling module 1926/1826 in the access/end node 1900/1800 to affect, e.g., set, modify, and/or monitor, the configuration and/or operation of the various modules included in the respective traffic control module 1928/1830, as needed to provide the proper quality of service treatment of the data information, e.g., traffic flows, to/from the application module 1828 in the end node 1800.

The exchange of control information, e.g., signaling flows and/or communication interfaces, is also shown a) between another node and control signaling module 1926 in access node 1900, b) between application module 1828 in end node 1800 and control signaling module 1826 in end node 1800, and c) between the respective control signaling modules 1926/1826 in access node 1900 and end node 1800. These exchanges of control information, e.g., signaling flows and/or communication interfaces, enable the configuration and/or operation of traffic control modules 1928/1830 in both access node 1900 and the end node 1800 to be affected by a) one or more additional nodes, e.g., the access control node 1720 and/or application server node 1826, b) application module 1828 in end node 1800, or c) a combination of one or more additional nodes and the application module 1828 in end mode 1800. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for configuring QoS with respect to a terminal, comprising:
    receiving identifying indicia associated with the terminal; and
    subsequently delivering a profile to an access node that is communicatively coupled to the terminal after receipt of the identifying indicia, the profile including:
        a first service class element and filter rule pair corresponding to an egress traffic service relating to egress traffic from an access node to a subscriber, said first service class element and filter rule pair including: i) a first service class element that includes parameters that prescribe a first QoS treatment and ii) a first set of one or more filter rules that identify an egress traffic flow to be provided the first QoS treatment; and
        a second service class element and filter rule pair corresponding to an ingress traffic service relating to ingress traffic from a subscriber to an access node, said second service class element and filter rule pair including: i) a second service class element that includes parameters that prescribe a second QoS treatment and ii) a second set of one or more filter rules that identify an ingress traffic flow to be provided the second QoS treatment.

2. The method of claim 1, further comprising performing authentication and authorization with respect to the terminal based at least in part upon the identifying indicia.

3. The method of claim 1,
    wherein said second QoS treatment is different from said first QoS treatment.

4. The method of claim 1, further comprising delivering the profile to multiple access nodes that are communicatively coupled to the terminal after receipt of the identifying indicia.

5. The method of claim 1,
    wherein said profile is a profile assigned to said terminal, said terminal being a mobile wireless terminal; and
    wherein said first service class element of said profile includes:
        a max rate element indicating a maximum data rate that can be provided to a traffic flow associated with the first service class.

6. The method of claim 1,
    wherein said profile is a profile assigned to said terminal, said terminal being a mobile wireless terminal; and
    wherein said first service class element of said profile further includes:
        a sharing weight element indicating a relative proportion of resources that a traffic flow associated with the first service class element should receive when competing with outer traffic flows.

7. The method of claim 6, wherein said first service class element further includes:
    a minimum rate element indicating a minimum data rate that can be provided to a traffic flow associated with the first service class.

8. The method of claim 1,
    wherein said profile is a profile assigned to said terminal, said terminal being a mobile wireless terminal; and
    wherein said first service class element of said profile further includes:
        a compression hint element including information used in determining at least i) a type of compression applicable to packets belonging to a traffic flow corresponding to the first service class element or ii) parameters needed for compression of packets belonging to a traffic flow corresponding the first service class element.

9. The method of claim of claim 1,
    wherein said profile is a profile assigned to said terminal, said terminal being a mobile wireless terminal; and
    wherein said first service class element includes:
        parameters needed for compression of packets belonging to a traffic flow corresponding the first service class element.

10. The method of claim 9, wherein said profile further includes:
    a service element including a grouping of parameters associated with establishing and maintaining connectivity by way of an air interface.

11. The method of claim 1, wherein at least one of said first and second service class elements in said profile is associated with a location constraint profile included in said profile, said location constraint profile prescribing points of attachment or locations through which a subscriber may be granted access for services.

12. The communications apparatus of claim 11, wherein presence of said location constraint profile indicates that access to services is to be limited to prescribed points of attachment or locations.

13. The method of claim 1, wherein said first set of one or more filter rules includes rule priority information indicating the order in which a filter rule should be applied with respect to another filter rule included in said first set of filter rules.

14. The method of claim 1, wherein said first set of one or more filter rules includes rules for discarding packets belong to a packet flow.

15. A communications apparatus, comprising:
    means for receiving identifying indicia associated with a wireless terminal that is requesting access to one or more network services; and
    means for subsequently delivering a profile to an access node that is communicatively coupled to the terminal after receipt of the identifying indicia, the profile including:

a first service class element and filter rule pair corresponding to an egress traffic service relating to egress traffic from an access node to a subscriber, said first service class element and filter rule pair including: i) a first service class element that includes parameters that prescribe a first QoS treatment and ii) a first set of one or more filter rules that identify an egress traffic flow to be provided the first QoS treatment; and a second service class element and filter rule pair corresponding to an ingress traffic service relating to ingress traffic from a subscriber to an access node, said second service class element and filter rule pair including: i) a second service class element that includes parameters that prescribe a second QoS treatment and ii) a second set of one or more filter rules that identify an ingress traffic flow to be provided the second QoS treatment.

16. The communications apparatus of claim 15, further comprising means for generating the profile; and wherein an individual filter rule element is associated in said profile with a service class element to support a mapping between the traffic flow identified by the individual filter rule element and the associated service class element.

17. The communications apparatus of claim 15, further comprising means for retrieving the profile from a database of profiles upon receipt of the identifying indicia.

18. An apparatus comprising:

a non-transitory memory device having stored thereon machine-executable instructions for control a machine to:

receive an identity of at least one of a terminal and a subscriber; and deliver a profile assigned to the at least one of the terminal and the subscriber to a base station, wherein the profile includes:

a first service class element and filter rule pair corresponding to an egress traffic service relating to egress traffic from an access node to a subscriber, said first service class element and filter rule pair including: i) a first service class element that includes parameters that prescribe a first QoS treatment and ii) a first set of one or more filter rules that identify an egress traffic flow to be provided the first QoS treatment; and a second service class element and filter rule pair corresponding to an ingress traffic service relating to ingress traffic from a subscriber to an access node, said second service class element and filter rule pair including: i) a second service class element that includes parameters that prescribe a second QoS treatment and ii) a second set of one or more filter rules that identify an ingress traffic flow to be provided the second QoS treatment.

19. The apparatus of claim 18, wherein at least two QoS parameters defined within the profile are relative to one another; and wherein an individual filter rule element is associated in said profile with a service class element to support a mapping between the traffic flow identified by the individual filter rule element and the associated service class element.

20. The apparatus of claim 18, wherein said second QoS treatment is different from said first QoS treatment.

21. A communications apparatus comprising:

at least one processor configured to:

receive identifying indicia associated with a wireless terminal that is requesting access to one or more network services; and subsequently deliver a profile to an access node that is communicatively coupled to the terminal after receipt of the identifying indicia, the profile including:

a first service class element and filter rule pair corresponding to an egress traffic service relating to egress traffic from an access node to a subscriber, said first service class element and filter rule pair including: i) a first service class element that includes parameters that prescribe a first QoS treatment and ii) a first set of one or more filter rules that identify an egress traffic flow to be provided the first QoS treatment; and a second service class element and filter rule pair corresponding to an ingress traffic service relating to ingress traffic from a subscriber to an access node, said second service class element and filter rule pair including i) a second service class element that includes parameters that prescribe a second QoS treatment and ii) a second set of one or more filter rules that identify an ingress traffic flow to be provided the second QoS treatment; and a memory coupled to said at least one processor.

22. The communications apparatus of claim 21, wherein said at least one processor is further configured to perform authentication and authorization with respect to the wireless terminal based at least in part upon the identifying indicia.

23. The communications apparatus of claim 21, wherein said second QoS treatment is different from said first QoS treatment.

24. The communications apparatus of claim 21, wherein said at least one processor is further configured to deliver the profile to multiple access nodes that are communicatively coupled to the terminal after receipt of the identifying indicia.

* * * * *